United States Patent
Fujino

(10) Patent No.: US 7,327,391 B2
(45) Date of Patent: Feb. 5, 2008

(54) AUTOMATIC IMAGE QUALITY ADJUSTMENT ACCORDING TO BRIGHTNESS OF SUBJECT

(75) Inventor: Makoto Fujino, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 767 days.

(21) Appl. No.: 10/712,402

(22) Filed: Nov. 12, 2003

(65) Prior Publication Data

US 2005/0008243 A1 Jan. 13, 2005

(30) Foreign Application Priority Data

Nov. 15, 2002 (JP) .............................. 2002-332352

(51) Int. Cl.
*H04N 5/222* (2006.01)

(52) U.S. Cl. .............................. 348/230.1; 348/222.1; 348/223.1

(58) Field of Classification Search ............ 348/222.1, 348/231.3, 223.1, 207.1, 348
See application file for complete search history.

(56) References Cited

U.S. PATENT DOCUMENTS

| | | | |
|---|---|---|---|
| 6,870,567 B2 * | 3/2005 | Funston et al. ......... | 348/333.04 |
| 6,930,718 B2 * | 8/2005 | Parulski et al. ......... | 348/333.11 |
| 6,952,223 B2 * | 10/2005 | Terashita ................. | 348/222.1 |
| 7,184,079 B2 * | 2/2007 | Hoshuyama ............ | 348/223.1 |
| 2002/0140952 A1 * | 10/2002 | Fukasawa ................. | 358/1.6 |
| 2002/0167592 A1 * | 11/2002 | Toyoda et al. ........... | 348/207.1 |
| 2003/0076420 A1 * | 4/2003 | Akiyama et al. ........ | 348/207.1 |

FOREIGN PATENT DOCUMENTS

| | | |
|---|---|---|
| JP | 07-159904 | 6/1995 |
| JP | 2001-057680 | 2/2001 |
| JP | 2002-125243 | 4/2002 |
| JP | 2002-314834 | 10/2002 |
| JP | 2003-259392 | 9/2003 |

OTHER PUBLICATIONS

Abstract of Japanese Patent Publication No. 07-159904, Pub. Date: Jun. 23, 1995, Patent Abstracts of Japan.
Abstract of Japanese Patent Publication No. 2002-125243, Pub. Date: Apr. 26, 2002, Patent Abstracts of Japan.
Abstract of Japanese Patent Publication No. 2002-314834, Pub. Date: Oct. 25, 2002, Patent Abstracts of Japan.
Abstract of Japanese Patent Publication No. 2001-057680, Pub. Date: Feb. 27, 2001, Patent Abstracts of Japan.
Abstract of Japanese Patent Publication No. 2003-259392, Pub. Date: Sep. 12, 2003, Patent Abstracts of Japan.

* cited by examiner

*Primary Examiner*—David Ometz
*Assistant Examiner*—Pritham D. Prabhakher
(74) *Attorney, Agent, or Firm*—Martine Penilla & Gencarella, LLP

(57) ABSTRACT

The image processing device performs image processing using image data generated by an image generating device, and image generation record information associated with the image data where the image generation record information includes at least operating information about the image generating device at the time of generation of the image data. A picture quality adjuster is able, when the image generation record information includes subject brightness information relating to the brightness of a subject at the time of generation of the image data, to adjust the picture quality of the image data using the subject brightness level derived from the subject brightness information.

4 Claims, 22 Drawing Sheets

| Tag name | Parameter value |
|---|---|
| Subject brightness | 5(APEX) |
| Flash | • Auto flash mode<br>• Fired<br>• Reflected light sensor present<br>• Reflected light sensed |
| Subject distance | 1.5(m) |
| Subject distance range | Near distance |
| Flash intensity | 1000(BCPS) |
| Aperture value | F4 |
| Shutter speed | 1/60 sec |
| ISO speed rate | 100 |
| White balance | Auto |

⋮

COLOR SHIFT CALCULATION AREA

COLOR SHIFT CALCULATION AREA

Fig.21

| Scene | Standard | Portrait |
|---|---|---|
| Contrast | Standard | Moderately soft |
| Brightness | Standard | Moderately bright |
| Saturation | Standard | Moderately low |
| Sharpness | Standard | Moderately weak |
| Memory color | OFF | Skin color |
| Noise reduction | OFF | OFF |

AUTOMATIC IMAGE QUALITY ADJUSTMENT ACCORDING TO BRIGHTNESS OF SUBJECT

BACKGROUND OF THE INVENTION

1. Field of the Invention

The present invention relates to an image quality adjustment technique for adjusting picture quality of image data.

2. Description of the Related Art

The picture quality of image data generated by a digital still camera (DSC), digital video camera (DVC) or the like can be adjusted as desired using an image retouching application on a personal computer. An image retouching application is typically equipped with a picture quality adjusting function for automatically adjusting picture quality of image data; by using this picture quality adjusting function, the picture quality of an image output by an output device can be improved. CRTs, LCDs, printers, projectors, and television receivers, for example, are known as image output devices.

A printer driver, which controls the operation of one of these output devices, namely, a printer, is also equipped with a function for automatically adjusting picture quality, and the quality of printed images can be improved using such a printer driver as well.

However, the automatic picture quality adjusting functions provided by image retouching applications or printer drivers execute quality correction based on image data deemed to have typical standard image characteristics. On the other hand, the image data being subjected to image processing may have been produced under various conditions, so in some instances quality will not be improved by executing a single standardized automatic picture quality adjusting function.

The light source providing illumination of a subject may be selected according to shooting location, time of day, and user preference from among various sources such as natural light sources (e.g. sunlight) or artificial light sources (e.g. fluorescent or incandescent lighting, or candlelight). The spectral distribution of light is different for different light sources. Thus, for a given subject, images of unnatural color (color shift) may occur with light sources of different types. For example, where a light source contains intense red light, such as candlelight, images may appear reddish. The extent of color deviation is termed "color balance." Since adjustment of color deviation is frequently performed with reference to a white image area that is substantially achromatic, it is also referred to as "white balance."

In image generating devices as well, various operating settings may be selected according to user preference or type of subject. For example, when photographing a person under sunny skies, forced flash may be used in some instance in order to reduce shadowing on the face, even where the subject is bright overall.

Where picture quality correction based on image data deemed to have typical picture quality characteristics is performed on images produced with different image generating device operating settings, or color shifted images, it will not be possible in some instances to improve overall image picture quality. This problem is not limited to DSCs, and is shared by DVCs and other such image generating devices.

SUMMARY OF THE INVENTION

An object of the present invention is to attain appropriate automatic adjustment of picture quality for an individual set of image data.

The image processing device according to an aspect of the invention is a device for processing an image using image data generated by an image generating device and image generation record information that is associated with the image data, and that includes at least operating information about the image generating device at the time of generation of the image data. The image processing device comprises a picture quality adjuster that, in the event that the image generation record information includes subject brightness information relating to the brightness of a subject at the time of generation of the image data, adjusts picture quality of the image data using brightness level obtained from the image generation record information.

According to this image processing device, picture quality adjustment is performed using the brightness level of the subject, whereby automatic adjustment of picture quality can be performed appropriately for individual sets of image data.

This invention may be realized in various modes, for example, an image output method and image output device; an image data processing method and image data processing device; a computer program for realizing functions of such a method or device; a storage medium having such a computer program stored thereon; and a data signal containing such a computer program and embodied in a carrier wave.

These and other objects, features, embodiments, and advantages of the present invention will be apparent from the following description of the preferred embodiments set forth hereinbelow together with drawings.

BRIEF DESCRIPTION OF THE DRAWINGS

FIG. 5 is an explanatory diagram describing an example of data structure in an Exif data field.

FIG. 21 illustrates content of a process adapted to a shooting scene.

DESCRIPTION OF THE PREFERRED EMBODIMENT

Figure 1:
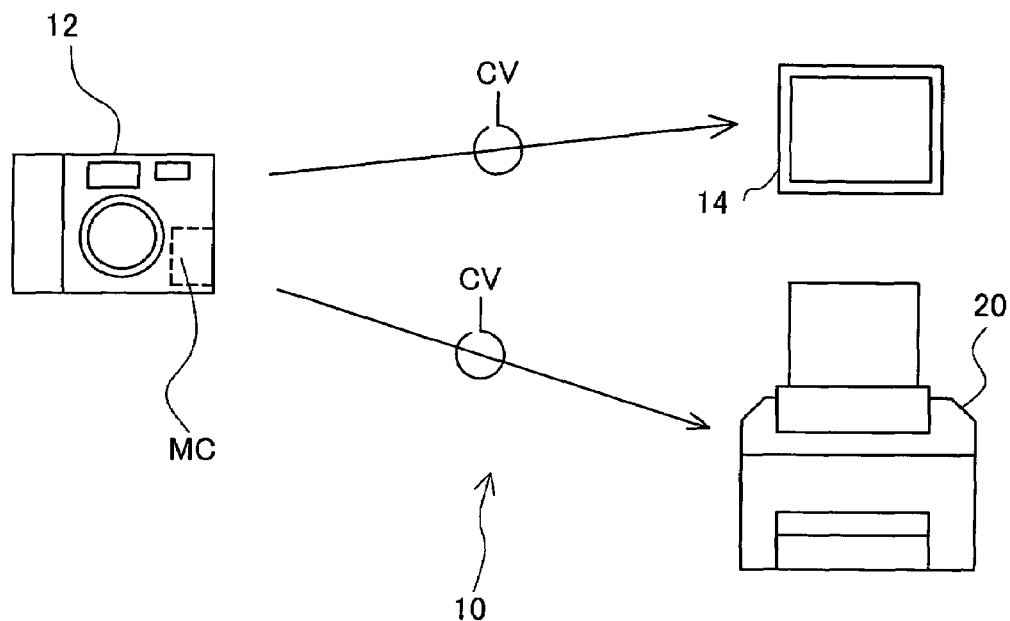
FIG. 1 is a block diagram showing the arrangement of an image output system as an embodiment of the invention.

The embodiments of the invention are described hereinbelow through examples, in the following order.
A. Arrangement of an Image Output System
B. Arrangement of an image file
C. Arrangement of an Image Output Device
D. Image processing in a Digital Still Camera
E. Image processing in a Printer
F. Example of an Automatic Picture quality Adjustment Process
G. Example of a Color Balance Adjustment Process
H. Examples of Color Balance Adjustment Process Depending on Subject Brightness
I. Other Examples of Automatic Picture quality Adjustment Process
J. Arrangement of an Image Output System Employing an image data Processing Device
K. Variant Examples A. Arrangement of an Image Output System FIG. 1 is a block diagram showing the arrangement of an image output system as an embodiment of the invention. Image output system 10 comprises a digital still camera 12 as an image generating device for generating an image file; and a printer 20 as an output device for images. An image file generated by digital still camera 12 is transferred to printer 20 via a cable CV, or by directly inserting into printer 20 a memory card MC on which the image file is stored. Printer 20 executes picture quality adjustment processing of the image data based on the read out image file, and outputs an image. As the output device, monitor 14 such as a CRT display and LCD display, a projector, or the like could be used in addition to or instead of printer 20. The following description is based on the use of a printer 20 comprising a picture quality adjuster and an image output unit as the output device, with a memory card MC being inserted directly into the printer 20.

Figure 2:
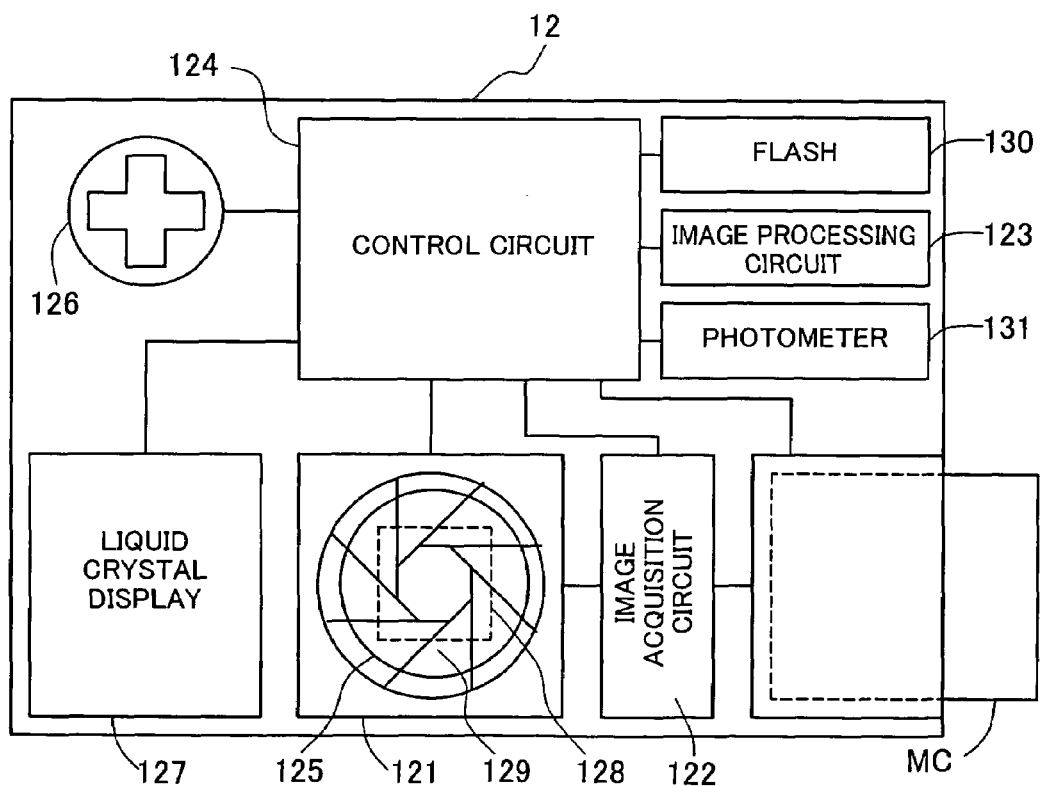
FIG. 2 is a block diagram showing a simplified arrangement of a digital still camera 12.

FIG. 2 is a block diagram showing a simplified arrangement of digital still camera 12. The digital still camera 12 in this example comprises an optical circuit 121 for collecting optical information; an image acquisition circuit 122 for controlling the optical circuit to acquire an image; an image processing circuit 123 for processing the acquired digital image; a flash 130 serving as a supplemental light source; a control circuit 124 for controlling the various circuits; and a light meter 131 for measuring subject brightness. Control circuit 124 comprises memory, not shown. Optical circuit 121 comprises a lens 125 for collecting optical information; an aperture 129 for adjusting exposure; and a CCD 128 for converting optical data passing through the lens into image data.

Digital still camera 12 stores the acquired image on a memory card MC. The typical storage format for image data in digital still camera 12 is the JPEG format, but other storage formats, such as TIFF format, GIF format, BMP format, or RAW data format could be used.

Digital still camera 12 comprises a Select/Set button 126 for setting various shooting parameters (described later); and a liquid crystal display 127. Liquid crystal display 127 is used to preview an image for shooting, or when setting aperture and other parameters using the Select/Set button 126.

When a picture has been shot by digital still camera 12, image data and image generation record information are stored together as an image file on memory card MC. Image generation record information can include aperture value and other parameter settings at the time of shooting (time of generation of image data) described in detail hereinbelow.

B. Arrangement of Image File

Figure 3:
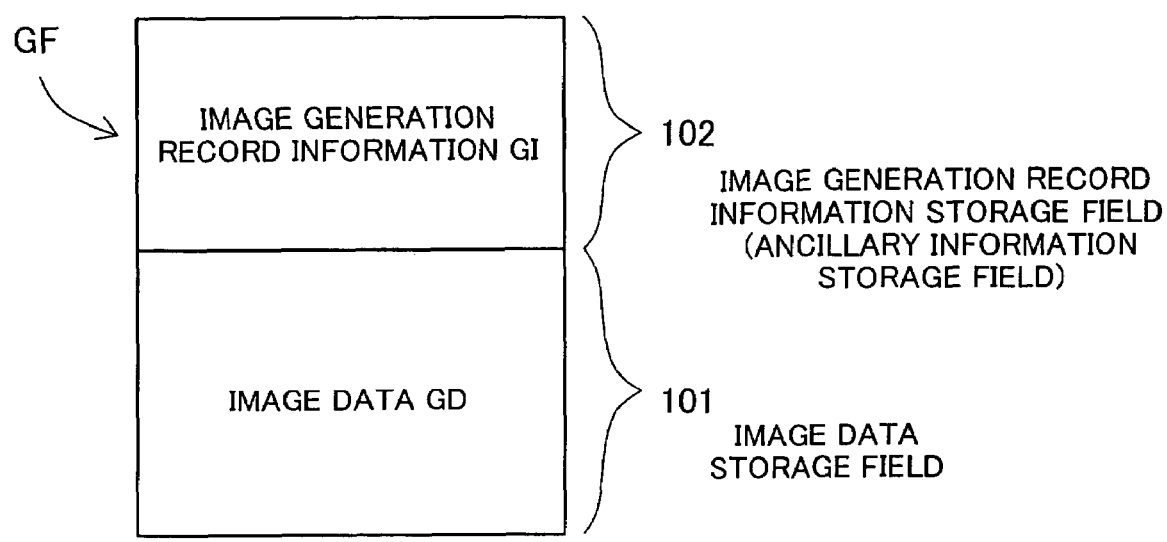
FIG. 3 is an explanatory diagram conceptually illustrating an example of an arrangement within an image file that can be used in this embodiment.

FIG. 3 is an explanatory diagram conceptually illustrating an example of an arrangement within an image file that can be used in this embodiment. Image file GF comprises an image data storage field 101 for storing image data GD; and an image generation record information storage field 102 for storing image generation record information GI. Image data GD is stored, for example, in JPEG format, whereas image generation record information GI is stored, for example, in TIFF format (a format in which data and data fields are specified using tags). The terms "file structure" and "data structure" in this embodiment refer to file or data structure in the form in which a file or data etc. is stored in a memory device.

Image generation record information GI is information relating to an image when image data is generated (shot) by digital still camera 12 or other such image generating device, and includes the following settings.
subject brightness value
flash (flash on/off)
subject distance
subject distance range
flash intensity
aperture value
ISO speed rate (ISO speed)
white balance
shooting mode
maker name
model name
gamma value It is sufficient that the image file GF in this example includes an image data storage field 101 and an image generation record information storage field 102; and it may have a file structure according to an existing standardized file format. The following specific description pertains to a case where the image file GF pertaining to this embodiment conforms to the Exif file format.

An Exif file has a file structure in accordance with the image file format specification (Exif) for digital still cameras, which specification has been proposed by the Japan Electronics and Information Technology Industries Association (JEITA). Similar to the conceptual diagram in FIG. 3, the Exif file format includes a JPEG image data storage field for storing image data in the JPEG format; and an ancillary information storage field for storing information of various kinds relating to stored JPEG image data. The JPEG image data storage field corresponds to the image data storage field 101 in FIG. 3, and the ancillary information storage field to the image generation record information storage field 102. The ancillary information storage field stores image generation record information relating to a JPEG image, such as shooting date/time, aperture value, and subject distance.

Figure 4:
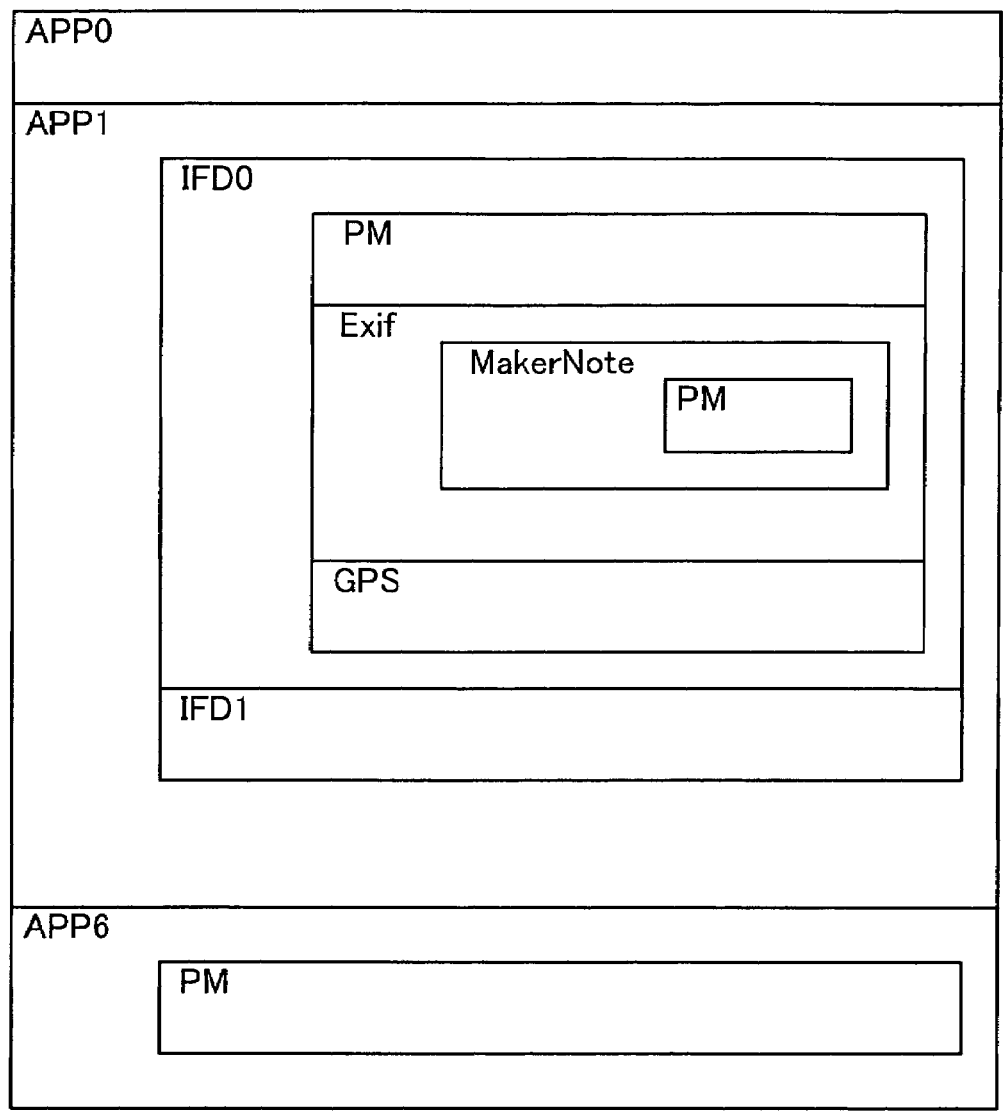
FIG. 4 is an explanatory diagram describing an example of data structure of an ancillary information storage field 103.
Figure 4:

FIG. 4 is an explanatory diagram describing an example of data structure of ancillary information storage field 103. In the Exif file format, hierarchical tags are used to designate data fields. Each data field contains a plurality of subordinate data fields identified by subordinate tags. In FIG. 4, areas enclosed by rectangles represent single data fields, with tag names noted at upper left. In this embodiment, three data fields whose tag names are APP0, APP1, and APP6 are included. The APP1 data field contains two data fields whose tag names are IFD0 and IFD1. The IFD0 data field contains three data fields whose tag names are PM, Exif, and GPS. Data and data fields are stored according to a prescribed address or offset value; address or offset value can be searched by means of tag name. The output device can retrieve data corresponding to desired information by means of specifying an address or offset value corresponding to the desired information.

FIG. 5 is an explanatory diagram describing an example of data structure (data tag names and parameter values) in the Exif data field in FIG. 4, wherein tag name can be referenced by tracing in the order APP1-IFD0-Exif. As shown in FIG. 4, the Exif data field can include a data field whose tag name is MakerNote; the MakerNote data field can in turn include a plurality of items of data, although these have been omitted from FIG. 5.

As shown in FIG. 5, the Exif data field stores parameter values relating to information such as subject brightness, flash, subject distance, flash intensity, aperture value, shutter speed, and ISO speed rate, white balance, etc. In this example, subject brightness represents metered brightness information indicating the result of metering the brightness of the subject at the time the image data is created, and is employed as the subject brightness information for the image data. Flash is used as supplemental light source firing information; subject distance and subject distance range as information relating to the distance between the subject of the image data and the image generating device; aperture value as information relating to aperture value; shutter speed as information relating to shutter speed; and ISO speed rate as information relating to the sensitivity of the optical circuit.

Subject brightness information relates to the brightness of a subject at the time the image data is created, and stores as a parameter value the result of measurement by a light meter provided to the image generating device. The unit for the parameter value is APEX, and can be used as subject brightness level. The use of the subject brightness in conjunction with other shooting conditions represented in APEX units (aperture, shutter speed, optical circuit sensitivity (ISO speed rate), will facilitate determination and verification of proper values for these shooting conditions.

Flash information relates to operation of the flash, and can include four sets of information relating to operating mode and operation result thereof. Operating mode may be selected from among a plurality of values including the following three values, for example.
1: forced flash mode
2: flash off mode
3: auto flash mode Operation result may be set from among two values, "fired" or "not fired", for example. The decision as to whether or not there was illumination by the supplemental light source during generation of image data may be carried out using this operation result.

Among image generating devices, certain devices are equipped with a mechanism for sensing reflected light from a subject illuminated with light from a flash. In the event that a flash cover or other obstacle blocks the light from the flash, or the flash does not fire despite being operated, no light illuminates the subject. Such instances can be identified through the presence or absence of reflected light. Flash information can include information relating to the presence/absence of a reflected light sensing mechanism, and to the presence/absence of reflected light sensed at the time the image data is generated (time of shooting). In the event that a reflected light sensing mechanism is present but sensed reflected light is absent, it can be decided that there is no illumination by the supplemental light source, even if the aforementioned operation result indicates "fired".

In the event that an image generating device is not equipped with a flash, flash information can be set to "no flash." From a "no flash" setting, it can be concluded that there is no illumination provided by a supplemental light source.

Subject distance information relates to the distance between the image generating device and a subject when image data is generated. For example, it can be set in meter units, based on distance information set to equal the focal point at the time that image data is generated.

Subject distance range information relates to the distance between the image generating device and a subject when image data is generated. The parameter is set by selecting one from among a plurality of distance ranges, depending on distance from the subject. For example, macro (0-1 m), near (1-3 m), and far (3 m-) could be used.

Flash intensity information relates to the quantity of light emitted by the flash at the time that image data is generated; the unit of measurement thereof is BCPS (Beam Candle Power Seconds), for example.

Aperture value is information relating to aperture at the time that image data is generated; F number is used as the parameter value. Accordingly, a higher aperture value means a smaller aperture.

Shutter speed information relates to shutter speed at the time that image data is generated; the unit is seconds.

ISO speed rate information is information relating to the sensitivity of the optical circuit, and is set to a parameter value equivalent to ISO speed, which is an index of sensitivity of silver salt film. ISO speed is used in combination with aperture or other parameters relating to image generation, to establish suitable conditions for image generation (shooting conditions). Digital still cameras and other image generating devices use equivalent ISO speed as an index representing sensitivity of an optical circuit, to set appropriate conditions for image generation such as aperture value.

White balance information relates to the white balance (color balance) setting mode of image data when the image data is generated. When an image generating device generates image data, if the user has manually set the white balance (color balance), "manual" will appear as the parameter value of the white balance information. As an example of a method by which the user can set white balance, the user could, for example, select a type of light source depending on shooting conditions or personal preference, whereupon the image generating device adjusts color balance on the basis of the selected information and generates the image data. Where the user has not set white balance, "auto" will appear as the parameter value of the white balance information.

All of the above information represents operating information for an image generating device. This operating information can be set by the user when generating image data, or set automatically by the image generating device. Certain image generating devices allow the user to set a shooting mode, whereupon the image generating device automatically sets the related parameters (aperture value, ISO speed, etc.) according to the selected shooting mode. Shooting mode may be selected from among a number of predetermined modes, such as standard mode, portrait mode, landscape mode, night scene mode, or the like. Where standard mode has been selected as the shooting mode, parameters relating to generation of image data are set to standard values.

Information associated with image data is also stored appropriately in fields other than the Exif data field in FIG. 4. For example, maker name and model name are stored in the data field whose tag name is IFD0, as information identifying the image generating device.

C. Arrangement of an Image Output System

Figure 6:
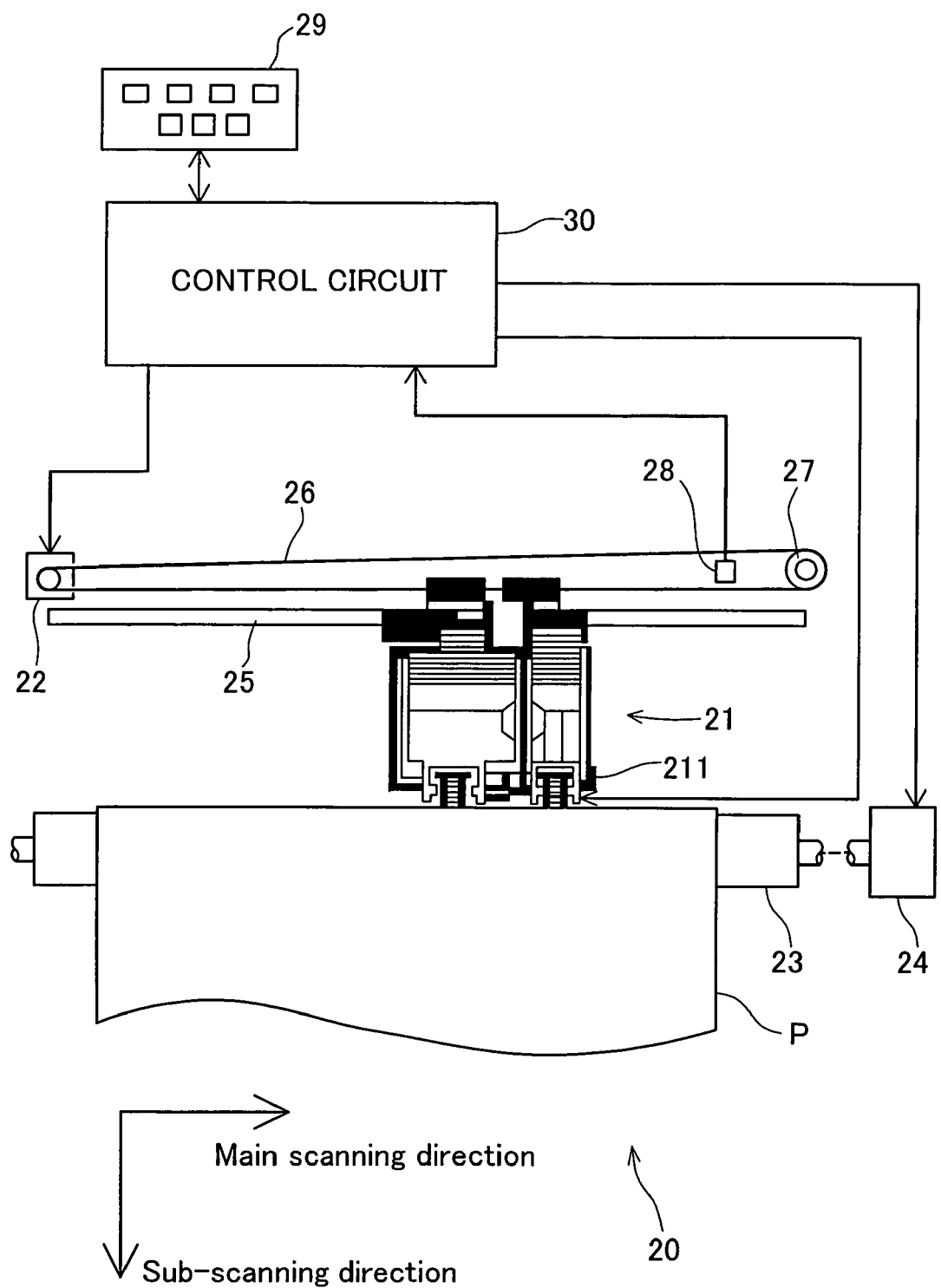
FIG. 6 is a block diagram showing a simplified arrangement of a printer 20.

FIG. 6 is a block diagram showing a simplified arrangement of printer 20 in the present embodiment. Printer 20 is a printer capable of image output, for example, an ink jet printer that ejects ink of four colors, cyan C, magenta Mg, yellow Y, and black K, onto a print medium to produce a dot pattern. An electrophotographic printer that transfers and fixes toner onto a print medium may be used instead. In addition to the four colors indicated above, light cyan LC which is lighter in density than cyan C, light magenta LM which is lighter in density than magenta Mg, dark yellow DY which is darker in density than yellow Y may be used as ink. Where monochromatic printing is performed, the arrangement may employ black K only; or red or green may be used. The type of ink or toner used can be selected depending on the characteristics of the image for output.

As shown in the drawing, printer 20 comprises a mechanism for driving a print head 211 mounted on a carriage 21, to eject ink and form dots; a mechanism for reciprocating carriage 21 in the axial direction of a platen 23 by means of a carriage motor 22; a mechanism for feeding printer paper P by means of a paper feed motor 24; and a control circuit 30. By means of these mechanisms, printer 20 functions as an image output unit. The mechanism for reciprocating carriage 21 in the axial direction of a platen 23 is composed of a slide rail 25 extending parallel to the axis of platen 23, for slidably retaining carriage 21; a pulley 27 coupled via an endless drive belt 26 to a carriage motor 22; and a position sensor 28 for sensing the home position of carriage 21. The mechanism for feeding printer paper P is composed of platen 23; paper feed motor 24 which rotates platen 23; an auxiliary paper feed roller, not shown in the drawing; and a gear train (not shown) for transmitting rotation of paper feed motor 24 to platen 23 and the auxiliary paper feed roller.

Control circuit 30 exchanges signals with a printer control panel 29 while appropriately controlling operation of paper feed motor 24, carriage motor 22, and print head 211. Printer paper P supplied to printer 20 is set pinched between platen 23 and the auxiliary paper feed roller, and advanced by a predetermined amount depending on the rotation angle of platen 23.

Carriage 21 has a print head 211, and accommodates ink cartridges of utilizable inks. On the bottom face of print head 211 are disposed nozzles for ejecting utilizable inks (not shown).

Figure 7:
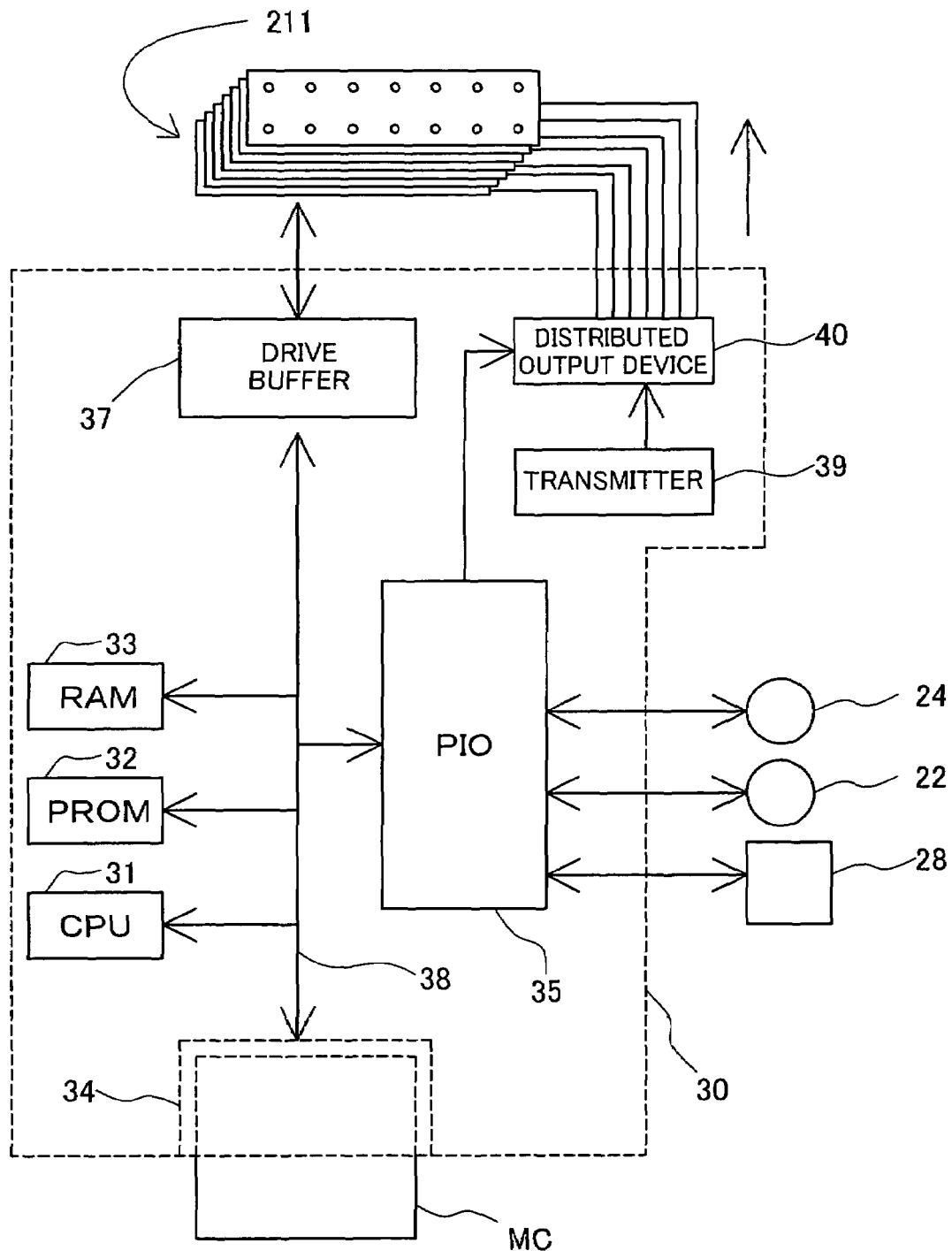
FIG. 7 is a block diagram showing an arrangement of printer 20, centered on the control circuit 30 of printer 20.

FIG. 7 is a block diagram showing an arrangement of printer 20, centered on the control circuit 30 of printer 20. Within control circuit 30 are disposed a CPU 31, PROM 32, RAM 33, a memory card slot 34 for acquiring data from a memory card MC, a peripheral device input/output unit (PIO) 35 for exchanging data with paper feed motor 24, carriage motor 22, etc., a drive buffer 37, and the like. Drive buffer 37 is used for supplying dot on/off signals to print head 211. These components are interconnected to a bus 38, enabling exchange of data among them. Control circuit 30 is also provided with a transmitter 39 for outputting a drive waveform at predetermined frequency, and a distributed output device 40 for distributing the output of transmitter 39 to print head 211 at predetermined timing.

Control circuit 30, in sync with operations of paper feed motor 24 and carriage motor 22, outputs dot data to drive buffer 37 at predetermined timing. Control circuit 30 also reads image files from memory card MC, analyzes the ancillary information, and performs image processing based on the image generation record information acquired thereby. That is, control circuit 30 functions as a picture quality adjuster. The flow of image processing executed by control circuit 30 will be described in detail hereinbelow.

D. Image Processing in a Digital Still Camera

Figure 8:
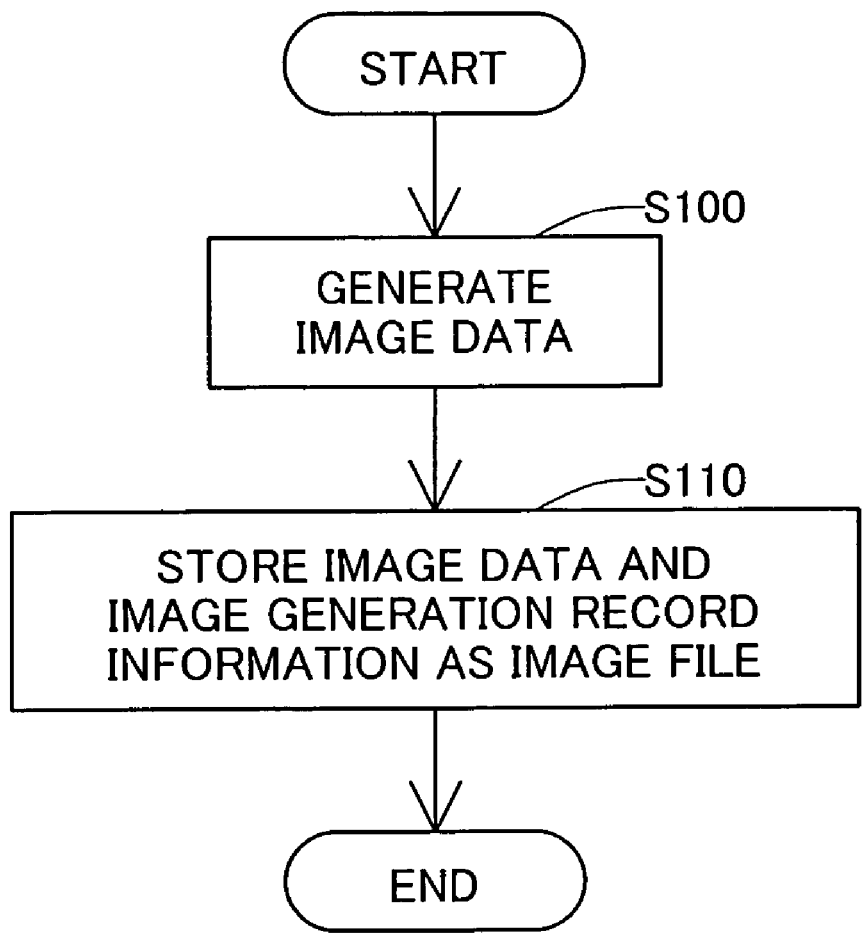
FIG. 8 is a flowchart showing a process flow for generating an image file GF in a digital still camera 12.

FIG. 8 is a flowchart showing a process flow for generating an image file GF in digital still camera 12.

Control circuit 124 (FIG. 2) of digital still camera 12 generates image data GD in response to a shoot request, for example, depression of a shutter button (Step S100). Where aperture value, ISO speed, shooting mode and other parameter settings have been made, image data GD is generated using the set parameter values.

Control circuit 124 stores the generated image data GD and image generation record information GI as an image file GF on memory card MC (Step S110), and terminates the processing routine. Image generation record information GI includes parameters used at the time of image generation, such as aperture value, ISO speed, etc.; shooting mode and/or other arbitrarily set parameter values; and parameter values set automatically, such as maker name, and model name. Image data GD is stored in image file GF after being converted from the RGB color space to the YCbCr color space, and compressed in JPEG format.

By means of the aforementioned processes executed in digital still camera 12, both image data GD and image generation record information GI that includes various parameter values at the time of generation of image data are defined in the image file GF stored on memory card MC.

E. Image Processing in a Printer

Figure 9:
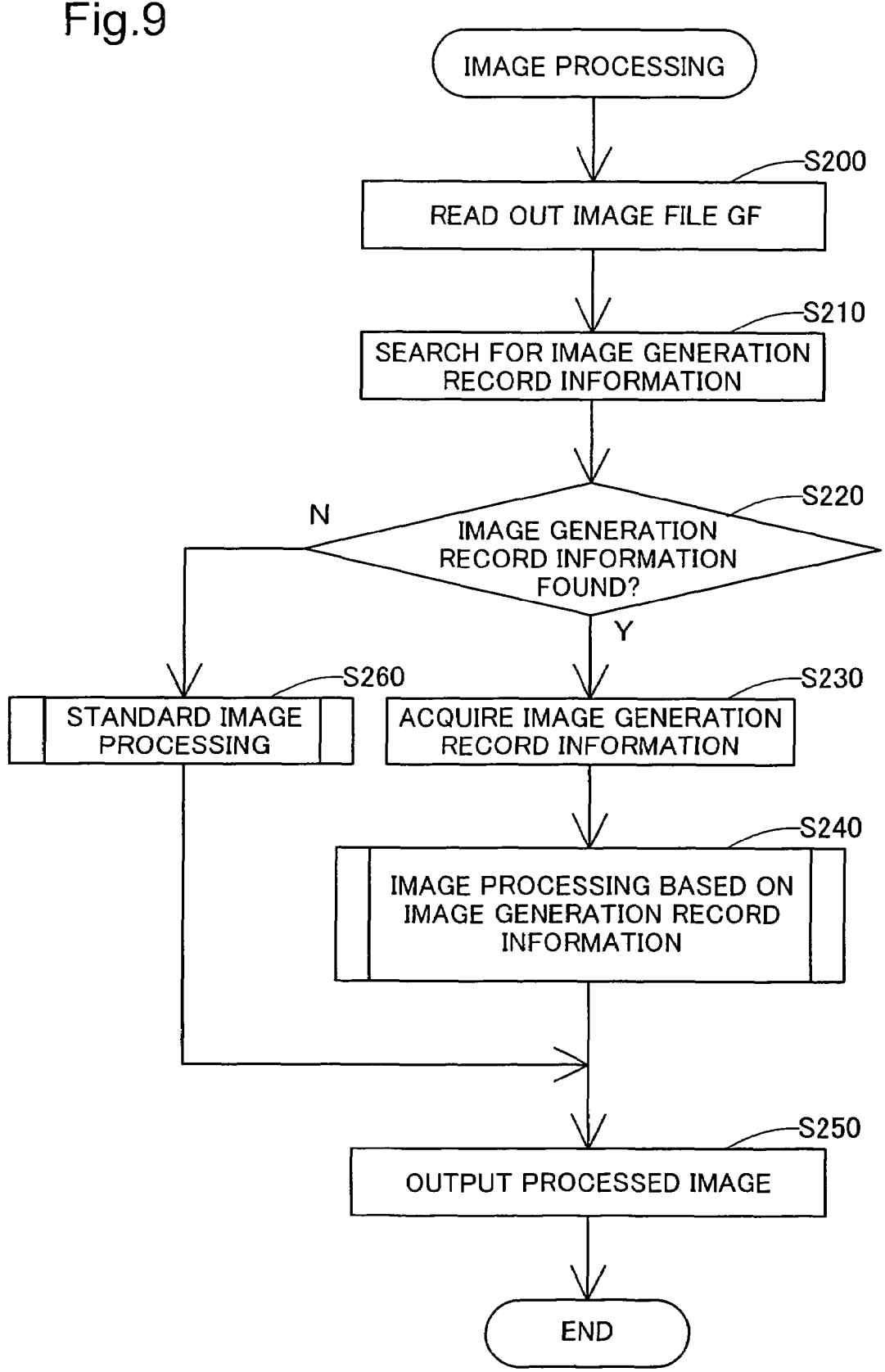
FIG. 9 is a flowchart showing a processing routine for image processing.

FIG. 9 is a flowchart showing a processing routine for image processing in printer 20 of the embodiment. The following description is based on a case where a memory card MC having an image file GF stored thereon is inserted directly into printer 20. When memory card MC has been inserted into memory card slot 34, the CPU 31 of control circuit 30 (FIG. 7) of printer 20 reads out the image file GF (FIG. 3) from memory card MC (Step S200). Next, in Step S210, CPU 31 searches in the ancillary information storage field of image file GF for image generation record information GI indicating information at the time that the image data was generated. In the event that image generation record information GI is found (Step S220: Yes), CPU 31 acquires and analyzes the image generation record information GI (Step S230). On the basis of the analyzed image generation record information GI, CPU 31 executes image processing, described hereinbelow (Step S240), outputs the processed image (Step S250), and terminates the processing routine.

An image file created by a drawing application or the like, on the other hand, will not contain image generation record information GI having information such as aperture value and the like. If CPU 31 cannot find image generation record information GI (Step S200: N), it performs standard processing (Step S260), outputs the processed image (Step S250), and terminates the processing routine.

Figure 10:
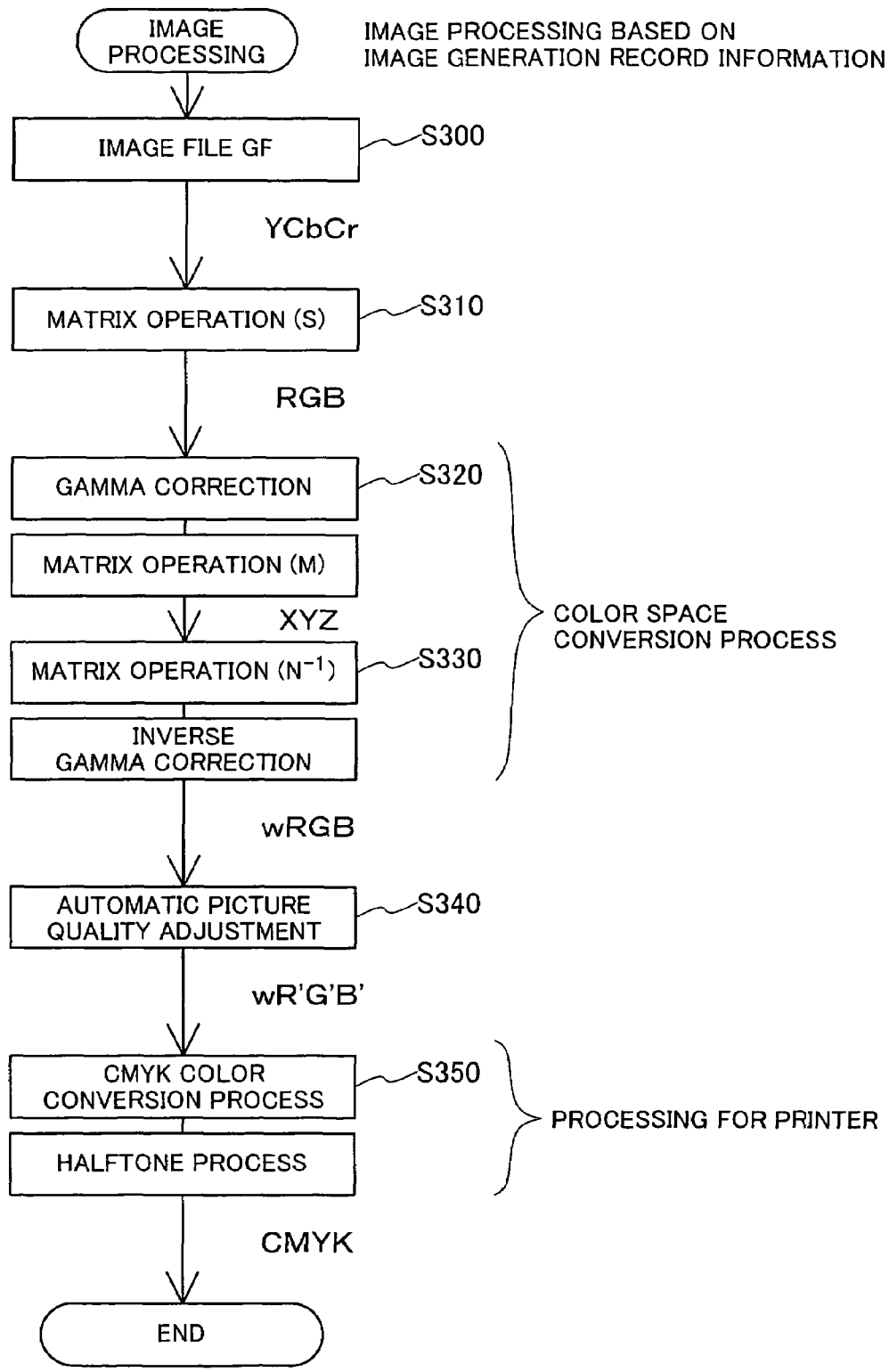
FIG. 10 is a flowchart showing a processing routine for image processing based on image generation record information.

FIG. 10 is a flowchart showing a processing routine for image processing (corresponding to Step S240 in FIG. 9) based on image generation record information. The CPU 31 of control circuit 30 (FIG. 7) of printer 20 reads out image data GD from the read out image file GF (Step S300)

As described previously, digital still camera 12 stores image data GD as JPEG format files, and in a JPEG format file image data is stored using an YCbCr color space. In Step S310, CPU 31 executes an operation using 3×3 matrix S to convert image data based on an YCbCr color space into image data based on an RGB color space. This matrix operation is represented by the following arithmetic expression, for example.

$$\begin{pmatrix} R \\ G \\ B \end{pmatrix} = S \begin{pmatrix} Y \\ Cb - 128 \\ Cr - 128 \end{pmatrix} \quad [\text{Eq. 1}]$$

$$S = \begin{pmatrix} 1 & 0 & 1.40200 \\ 1 & -0.34414 & -0.71414 \\ 1 & 1.77200 & 0 \end{pmatrix}$$

Where the color space of image data generated by digital still camera 12 is wider than a predetermined color space, for example, wider than the sRGB color space, image data based on the RGB color space obtained in Step S310 may in some instances contain valid data that is outside the defined gamut of the RGB color space. Where image generation record information GI indicates that this out-of-defined gamut data should be handled as valid data, the out-of-defined gamut data will be preserved as subsequent image processing continues. In the absence of an instruction to handle out-of-defined gamut data as valid data, out-of-defined gamut data will be clipped to the defined gamut. For example, where the defined area is 0-255, negative value data of less than 0 will be rounded to 0, and data above 256 to 255. In the event that the color space reproducible by the image output unit is not wider than a predetermined color space, for example, the sRGB color space, it will preferably be clipped to the defined gamut, regardless of any instruction in the image generation record information GI. Such instances would include, for example, cases where the reproducible color space is output to a CRT, which uses]he sRGB color space.

Next, in Step S320, CPU 31 performs gamma correction and an operation employing a matrix M, to convert image data based on an RGB color space to image data based on an XYZ color space. Image file GF can contain gamma value and color space information at the time of image generation. In the event that image generation record information GI includes this information, CPU 31 acquires the gamma value of the image data from the image generation record information GI, and executes a gamma conversion process of the image data using the acquired gamma value. CPU 31 then acquires color space information for the image data from the image generation record information GI, and performs a matrix operation on the image data using a matrix M that corresponds to the color space. In the event that image generation record information GI does not contain a gamma value, a gamma conversion process can be executed using a standard gamma value. A gamma value and matrix for the sRGB color space may be used respectively as this standard gamma value and matrix M, for example. The matrix operation may be given by the following arithmetic expression, for example.

$$\begin{pmatrix} X \\ Y \\ Z \end{pmatrix} = M \begin{pmatrix} Rt' \\ Gt' \\ Bt' \end{pmatrix} \quad [\text{Eq. 2}]$$

$$M = \begin{pmatrix} 0.6067 & 0.1736 & 0.2001 \\ 0.2988 & 0.5868 & 0.1144 \\ 0 & 0.0661 & 1.1150 \end{pmatrix}$$

$Rt, Gt, Bt \geq 0$ $$Rt' = \left(\frac{Rt}{255}\right)^{\gamma} \quad Gt' = \left(\frac{Gt}{255}\right)^{\gamma} \quad Bt' = \left(\frac{Bt}{255}\right)^{\gamma}$$

$Rt, Gt, Bt < 0$ $$Rt' = -\left(\frac{-Rt}{255}\right)^{\gamma} \quad Gt' = -\left(\frac{-Gt}{255}\right)^{\gamma} \quad Bt' = -\left(\frac{-Bt}{255}\right)^{\gamma}$$

The color space of image data obtained once the matrix operation has been executed is an XYZ color space. The XYZ color space is an absolute color space, i.e. a device-independent color space not dependent on a device such as a digital still camera or printer. Thus, device-independent color matching can be carried out by means of color space conversion through the agency of the XYZ color space.

Next, in Step S330, CPU 31 performs an operation employing a matrix $N^{-1}$, and inverse gamma correction to convert image data based on the XYZ color space to image data based on wRGB color space. Here, the wRGB color space can be a color space having a larger color gamut than the standard sRGB color space, and suitably selected in consideration of the color gamut reproducible by the printer. During inverse gamma correction, CPU 31 acquires a printer-side gamma value from PROM 32, and executes inverse gamma correction of the image data using the inverse of the acquired gamma value. CPU 31 then acquires from PROM 32 a matrix $N^{-1}$ that corresponds to the conversion from the XYZ color space to the wRGB color space, and performs a matrix operation on the image data using this matrix $N^{-1}$. This matrix operation may be given by the following arithmetic expression, for example.

$$\begin{pmatrix} Rw \\ Gw \\ Bw \end{pmatrix} = N^{-1} \begin{pmatrix} X \\ Y \\ Z \end{pmatrix} \quad [\text{Eq. 3}]$$

$$N^{-1} = \begin{pmatrix} 3.30572 & -1.77561 & 0.73649 \\ -1.04911 & 2.1694 & -1.4797 \\ 0.06568289 & -0.241078 & 1.24898 \end{pmatrix}$$

$$Rw' = \left(\frac{Rw}{255}\right)^{1/\gamma} \quad Gw' = \left(\frac{Gw}{255}\right)^{1/\gamma} \quad Bw' = \left(\frac{Bw}{255}\right)^{1/\gamma}$$

Next, in Step S340, CPU 31 executes automatic adjustment processing of picture quality. Automatic picture quality adjustment processing in the embodiment involves automatic picture quality adjustment processing of image data using image generation record information contained in the image file GF. Automatic picture quality adjustment processing is described hereinbelow.

Next, in Step S350, CPU 31 executes a CMYK color conversion process and a halftone process for the purpose of printing. In the CMYK color conversion process, CPU 31 refers to a look-up table (LUT), stored in PROM 32, for conversion from the wRGB color space to the CMYK color space, and converts the color space of the image data from the wRGB color space to the CMYK color space. That is, image data consisting of RGB tone level values is converted to image data for use by printer 20, consisting, for example, of tone level values for six colors, C (Cyan), M (Magenta), Y (Yellow), K (Black), LC (Light Cyan), and LM (Light Magenta).

In the halftone process, CPU 31 executes a so-called halftone process to produce halftone image data from the color-converted image data. This halftone image data is sequenced in the order in which it will be sent to drive buffer 37 (FIG. 7) to produce the final print data, whereupon the processing routine terminates. Image data processed by means of this processing routine is output in Step S250 of the image processing routine shown in FIG. 9.

Process flow in FIGS. 9-10 is the same in the other embodiments described hereinbelow.

F. Example of an Automatic Picture Quality Adjustment Process

Figure 11:
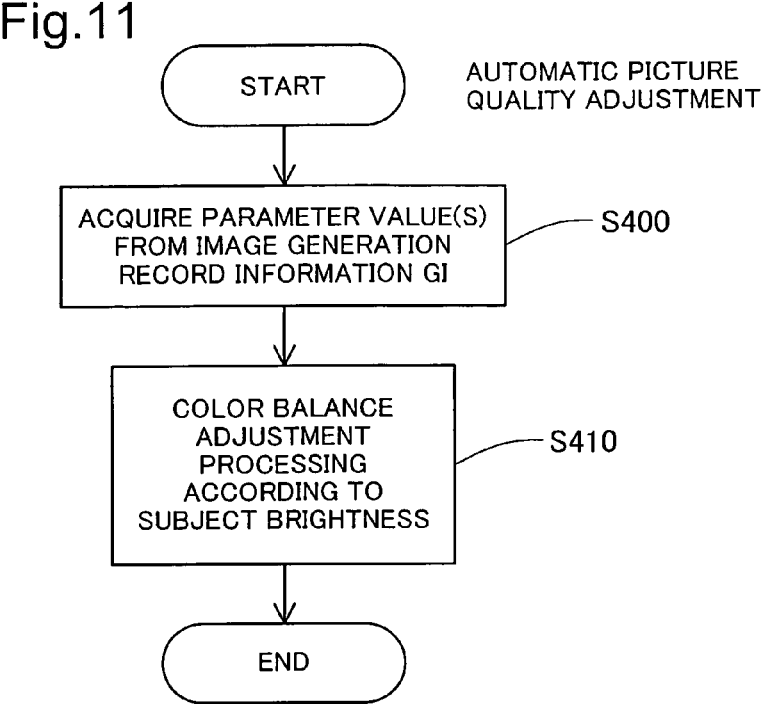
FIG. 11 is a flowchart showing a processing routine for automatic picture quality adjustment processing.

FIG. 11 is a flowchart showing a processing routine for an automatic picture quality adjustment process (corresponding to Step S340 in FIG. 10) in the embodiment. CPU 31 (FIG. 7) analyzes the image generation record information GI and acquires parameter values for subject brightness information etc. (Step S400). Next, in Step S410, CPU 31 executes a color balance adjustment process on the basis of the acquired brightness of the subject (described in detail hereinbelow) and terminates the automatic picture quality adjustment process.

G. Example of a Color Balance Adjustment Process

Figure 12:
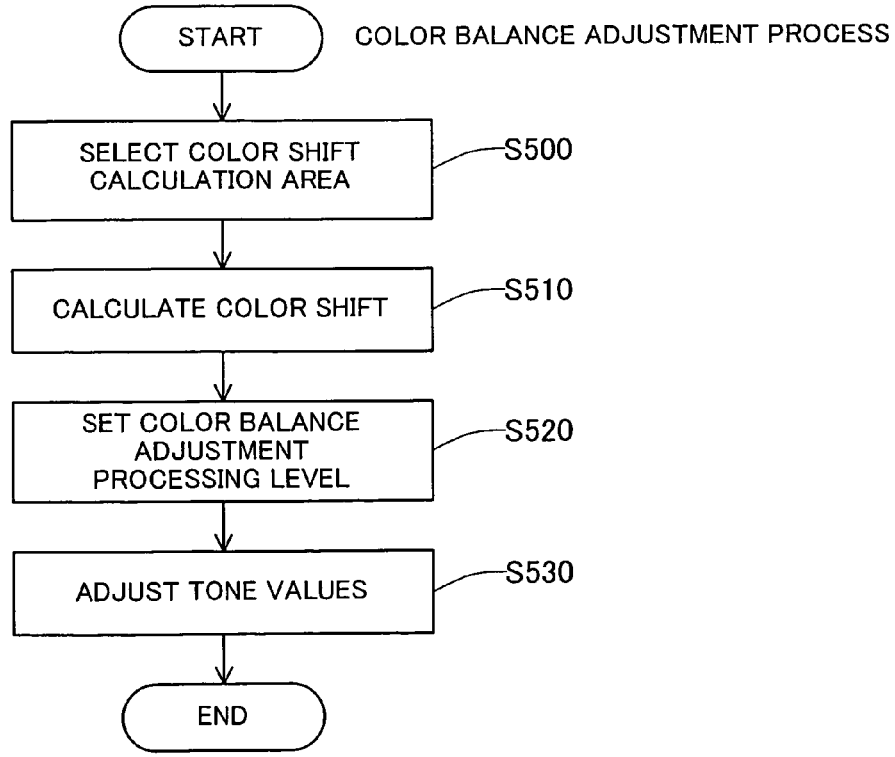
FIG. 12 is a flowchart showing a processing routine for a color balance adjustment process.

FIG. 12 is a flowchart showing a processing routine for a color balance adjustment process in the embodiment. In Step S500, CPU 31 (FIG. 7) selects an area that is substantially achromatic, for use in calculating color shift (described later). Next, in Step S510, using pixel values from the area selected in Step S500, color shift is calculated for each of the colors red R, green G, and blue B. Color shift is an indicator of the extent to which the colors in the image data are unnatural; color shift for red may be derived, for example, from the difference between the average value of tone values for red R and the average value of tone values for all colors together (described in detail later). As the type of colors used to calculate color shift, besides a combination of the primary colors red R, green G, and blue B, there could be used various other combinations such as cyan C, magenta Mg, and yellow Y. Next, in Step S520, the processing level for the color balance adjustment process is set, and in Step S350 the tone values of each color are adjusted so as to reduce the amount of color shift (described later).

Figure 13A:
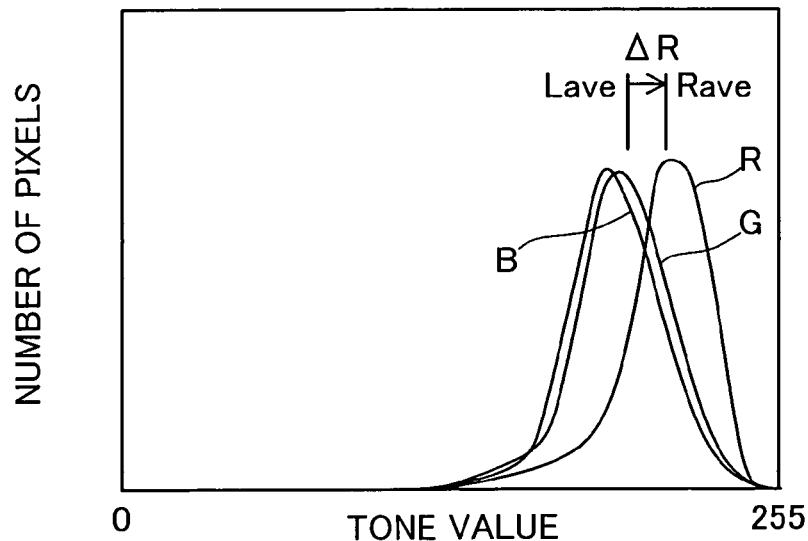
FIGS. 13(a) and 13(b) illustrate amount of color shift and tone value adjustment.
Figure 13B:
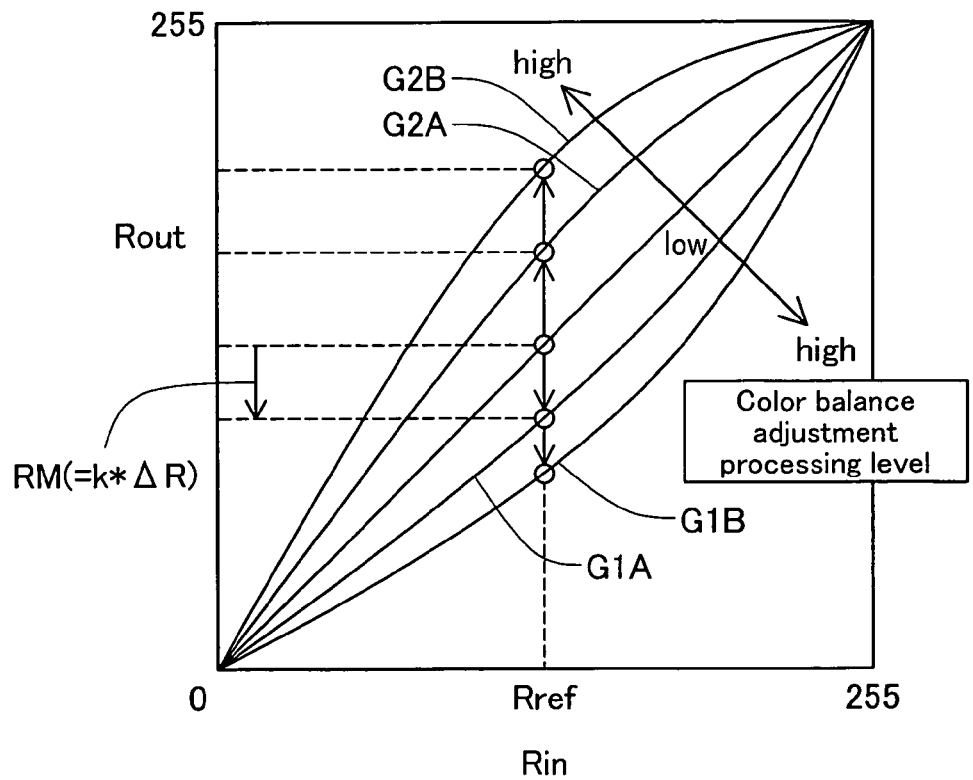

FIGS. 13(a) and 13(b) illustrate amount of color shift and tone value adjustment. FIG. 13(a) shows examples of tone value distributions for each of the colors red R, green G and blue B in a reddish image. These distributions represent tone value distributions in the substantially achromatic, color shift calculation area described later; red R is skewed to the high end relative to green G and blue B. Such an image having a red R distribution skewed to the high end could readily occur under a light source with a strong red light component, such as candlelight or incandescent light.

Equation 4 given below is a computational equation for calculating the extent of color shift $\Delta R$, $\Delta G$, $\Delta B$ in this example.

$\Delta R = Rave - Lave$ $\Delta G = Gave - Lave$ $\Delta B = Bave - Lave$ [Eq. 4]

Here, Rave, Gave, and Bave are average values of R, G, and B in the color shift calculation area, and Lave is brightness or lightness calculated from Rave, Gave, and Bave.

In the example given by Equation 4, color shifts $\Delta R$, $\Delta G$, $\Delta B$ for the colors RGB are given by average tone values Rave, Gave, and Bave for the RGB colors, and brightness Lave calculated using average tone value for the colors. A computational equation for calculating brightness is given by Equation 5, for example. An equation for converting from an RGB color space to a YCbCr color space could also be used.

$Y = L = 0.299*R + 0.587*G + 0.114*B$ [Eq. 5]

The brightness value Lave given by this computational equation can be termed average tone value for each of the colors red R, green G and blue B, calculated weighted by the difference in effective brightness depending on the color. Where color shift is minimal, average tone values Rave, Gave, and Bave for the colors RGB will be substantially equal, so the brightness value, i.e. the brightness-weighted average tone value Lave, will be substantially equal to the average tone values Rave, Gave, and Bave for the colors. As a result, color shifts $\Delta R$, $\Delta G$, $\Delta B$ for the colors will have small values. Where there is appreciable color shift, however, average tone values Rave, Gave, and Bave for the colors RGB will have different values from one another. In this case, color shift will be greater for color having greater deviation from the standard value represented by brightness value Lave. By using as a standard value for calculating color shift an average tone value (brightness value) calculated weighting different brightness depending on color, it is possible to calculate color shift that more closely approximates the human eye.

FIG. 13(b) illustrates the relationship between red R input level Rin and output level Rout in the tone value adjustment process of this example. Graph G1A is constituted such that output level Rout is smaller than input level Rin. By carrying out the tone value adjustment process using this graph G1A, in an image have undergone color shift to red, i.e., an image in which red R is skewed to the high end, the tone values for red R can be reduced so as to reduce the extent of color shift.

Such a graph G1A may be designed such that, for example, output level Rout at an adjustment input level Ref is adjusted so as to be smaller than the original value by an adjustment level RM. Output levels Rout at other input levels Rin are then interpolated using a spline function. Adjustment level RM is a value determined by color shift ΔR (FIG. 13(a), Equation 4); it is possible to use, for example, the color shift ΔR multiplied by a predetermined coefficient k. This predetermined coefficient k can be a value selected on the basis of sensory evaluation of image output results. The relationship between color shift ΔR and adjustment level RM need not necessarily be a proportional relationship; it is sufficient that adjustment level RM increases as color shift increases. Predetermined coefficient k can be used as intensity of the color balance adjustment process (described in detail later). A predetermined value can be used as the adjustment input level Ref. For example, where the range of values assumable by red R is 0-255, the median value of 128 could be used.

Graph G1B depicts an input/output relationship for use in a tone value adjustment process having a higher level of color balance adjustment processing than graph G1A. Here, "higher level of color balance adjustment processing" means larger change in color tone values. Where color shift ΔR is appreciable, the adjustment level RM calculated using predetermined coefficient k will be large, and the level of color balance adjustment processing will be high as well. It is accordingly possible to reduce skewed color even where color shift ΔR is appreciable. By designing the system so that the level of color balance adjustment processing increases with greater color shift, skewed color can be reduced appropriately, depending on the extent thereof.

By using a larger predetermined coefficient k for calculating adjustment level RM, adjustment level RM can be increased for a given color shift ΔR. As a result, the level of color balance adjustment processing for a given color shift can be increased. That is, the intensity of the color balance adjustment process can be increased by increasing coefficient k. Here, "high intensity of color balance adjustment process" means that the processing level of the color balance adjustment process is greater for a given color-shifted image. Thus, predetermined coefficient k can be called a process parameter that represents a ration of the processing level of the color balance adjustment process expressed to the extent of color shift, or a process parameter that affects the process result determining the processing level for the color balance adjustment process on the basis of the extent of color shift. Even where color balance adjustment processing intensity is high, the processing level in the color balance adjustment process will be low where the extent of color shift is small.

Graph G2A gives an input/output relationship designed so that output level Rout is large compared to input level Rin, and intended for use when red R is skewed towards the low end. Graph G2B gives an input/output relationship for use in a tone value adjustment process with a higher color balance adjustment processing level than graph G2A. Where a color is skewed towards the low end, that is, where average tone level Rave is smaller than the standard brightness value Lave, an adjustment level RM is established on the basis of the extent of color shift ΔR, and a color balance adjustment processing level is established, just as with skew towards the high end.

Relationships of input level to output level like those described above are established for the other colors besides red R.

Figure 14A:
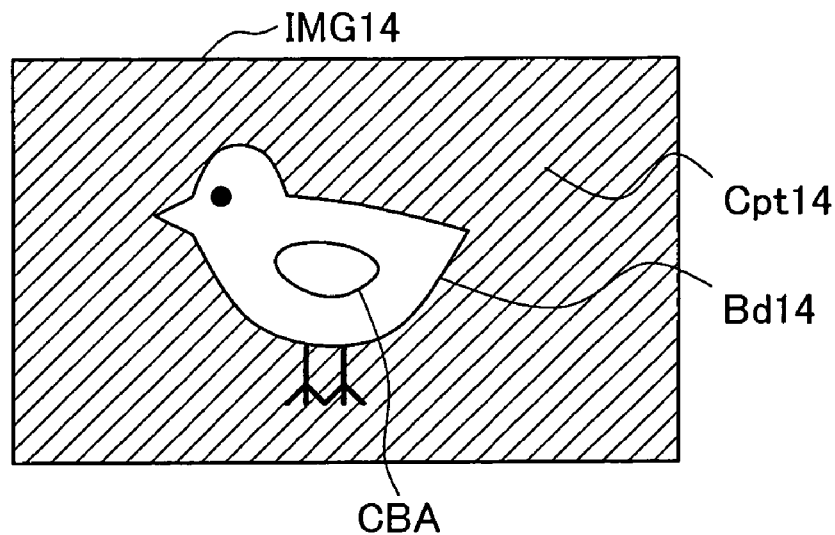
FIGS. 14(a) and 14(b) illustrate an area used for calculating the amount of color shift.

FIG. 14 illustrates an area used for calculating the amount of color shift. Image IMG14 in FIG. 14(a) depicts a white bird Bd14 on a green carpet Cpt14. Calculation of color shift is carried out with reference to pixel values within area CBA.

Figure 14B:
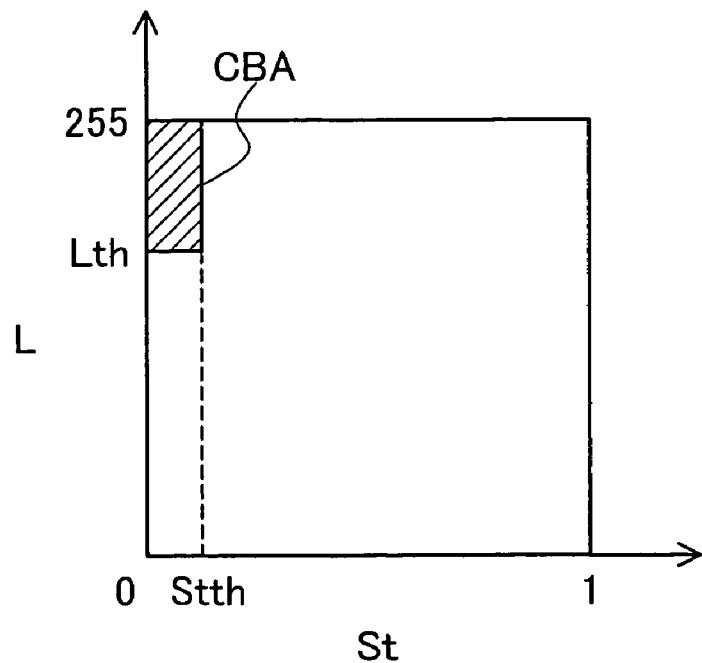

FIG. 14(b) illustrates conditions used to select area CBA for use in calculating color shift. The horizontal axis gives saturation St, and the vertical axis gives brightness L. In this example, substantially achromatic pixels that meet the following two conditions are selected as the pixels used in calculating color shift.

Condition (a1): saturation St does not exceed a threshold saturation value Stth.

Condition (b1): brightness L is not below a threshold brightness value Lth.

These two conditions a1, b1 may be understood as follows.

When a non-achromatic, brightly colored subject is photographed, saturation is high in the area where the subject is located. In this area, color shift of the distinctive colors of the subject will be fairly large, but this color shift is not the result of the type of light source. If color shift is calculated on the basis of color in this area, and tone adjustment performed so as to minimize the color shift so calculated, in some instances the distinctive bright coloring and hues of the subject may be significantly altered. Accordingly, by calculating color shift using an area that meets the aforementioned condition a1, i.e. saturation St not in excess of a threshold saturation value Stth, the color balance adjustment process can be carried out without significantly altering the distinctive bright coloring and hues of the subject. The threshold saturation value Stth may be a value arrived at on the basis of sensory evaluation of image output results. For example, where saturation can assume values in the range 0-1, a value of 0.1 would be acceptable. A smaller threshold saturation value means that the selected area will be closer to achromatic, and will thus further reduce the effect distinctive bright coloring and hues of the subject on the color balance adjustment process.

Areas of high brightness are highly likely the result of receiving intense light from a light source. Thus, high brightness areas are highly likely to reflect more intensely color shift occurring due to the spectral distribution of the light source. Accordingly, by calculating color shift using an area that meets the aforementioned condition b1, i.e., brightness L not below a threshold brightness value Lth, color shift produced by a particular type of light source can be calculated more accurately. The threshold brightness value Lth may be a value arrived at on the basis of sensory evaluation of image output results. For example, where brightness can assume values in the range 0-255, a value of 180 would be acceptable.

By using an area composed of pixels that meet the two conditions a1, b1 given above, calculation of color shift on the basis of type of light source can be done more appropriately. In the example of FIG. 14(a), the area CBA used for calculating color shift is composed of pixels that meet the two conditions a1, b1, and does not include the area of the green carpet Cpt14. Thus, where the green color of green carpet Cpt14 is a vivid green, appreciable color shift of the green color can be held in check. Pixels used in calculating color shift need not compose a single area as shown in FIG. 14(a), but may be isolated from one another. That is, all pixels meeting the aforementioned conditions a1, b1 are selected as pixels for use in calculating color shift.

Where image data is represented in a color space that does not include brightness (or lightness) and saturation parameters, for example, where represented in an RGB color space, brightness (or lightness) and saturation values at pixel locations may be derived through conversion to a color space that includes brightness (or lightness) and saturation values, for example, an HLS color space or HIS color space.

H. Examples of Color Balance Adjustment Process Depending on Subject Brightness

Figure 15A:
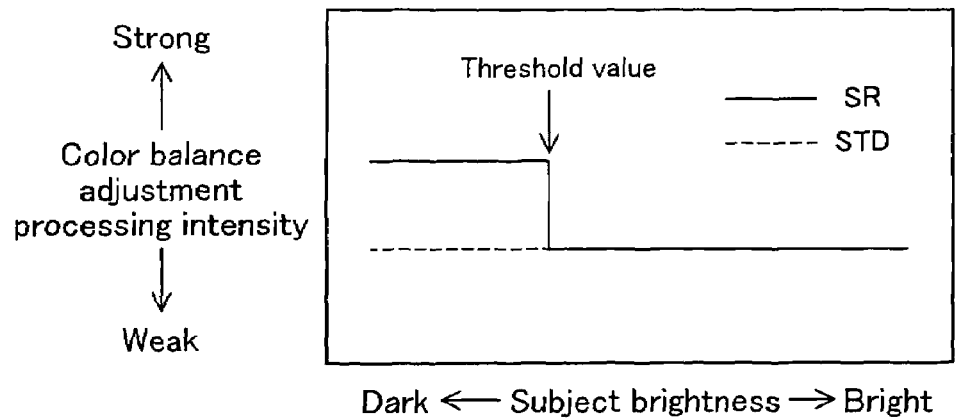
FIGS. 15(a) and 15(b) illustrate an example of a color balance adjustment process depending on subject brightness.
Figure 15B:
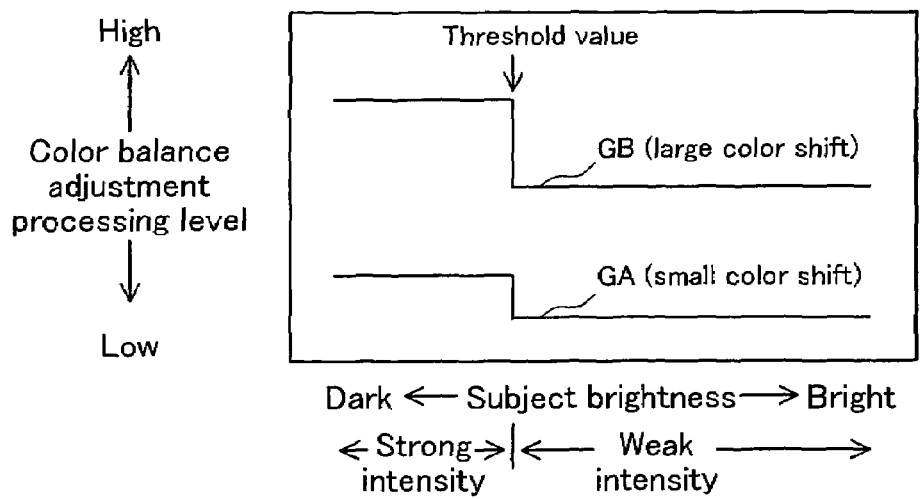

H1. Example 1 of a Color Balance Adjustment Process Depending on Subject Brightness FIG. 15 illustrates an example of a color balance adjustment process depending on subject brightness. FIG. 15(a) illustrates a relationship between subject brightness and intensity of color balance adjustment processing. A subject brightness value is included in the image generation record information GI shown in FIG. 5, and indicates the degree of brightness of the subject. The intensity of color balance adjustment processing may be expressed in terms of the ratio of the processing level of color balance adjustment processing to the extent of color shift, for example (in the example of FIG. 13(b), magnitude of predetermined coefficient k is used for intensity). In FIG. 15(a), graph SR shows a relationship used in color balance adjustment processing depending on subject brightness, and graph STD shows a relationship used in standard color balance adjustment processing without reference to subject brightness. Graph SR is constituted such that where subject brightness is below a predetermined threshold value, the intensity of color balance adjustment processing is greater than the intensity where subject brightness exceeds the predetermined threshold value. Graph STD is constituted such that intensity is constant irregardless of subject brightness. FIG. 15(b) illustrates a relationship between subject brightness and processing level in color balance adjustment processing when graph SR is used. As shown in FIG. 15(a), since the color balance adjustment processing intensity is greater where subject brightness is below the predetermined threshold value, for a given extent of color shift, processing level will be greater if subject brightness is smaller. Processing level is a value adjusted on the basis of color shift, and for a given level of subject brightness, processing level will be higher where the extent of color shift is greater.

The reason for modifying color balance adjustment processing intensity according to subject brightness value is because of the following considerations. Light source is one of the factors affecting subject brightness, i.e., the brightness of a subject. Various light sources are used, such as fluorescent, incandescent, candlelight, natural light (sunlight), and the like. Of these light sources, artificial light sources such as fluorescent, incandescent, or candlelight have spectral distributions that are markedly different from that of natural light, particularly daylight. Accordingly, shooting under such artificial light sources tends to produce image data that has large color shift and appears highly unnatural. Also, since artificial light sources are weaker than daylight, subject brightness tend to be low as well. Dusk and dawn light, although natural light, also have weaker light intensity than daylight, and also have spectral distributions that are different from daylight, and thus tend to result in image data with low subject brightness and appreciable color shift. On the other hand, shooting under natural light, particularly daylight, produces less color shift due to type or light source, i.e., to light source spectral distribution. Additionally, daylight has a higher quantity of light, and thus tends to produce a very bright subject. That is, color shift due to light source type is more likely when subject brightness is low. Therefore, by executing more intense color balance adjustment processing when the brightness of a subject is below a predetermined threshold value, it is possible to reduce color shift due to type of light source. The threshold value for subject brightness may be a value arrived at on the basis of sensory evaluation of image output results. For example, a threshold value of 3 in APEX units would be acceptable.

Figure 16:
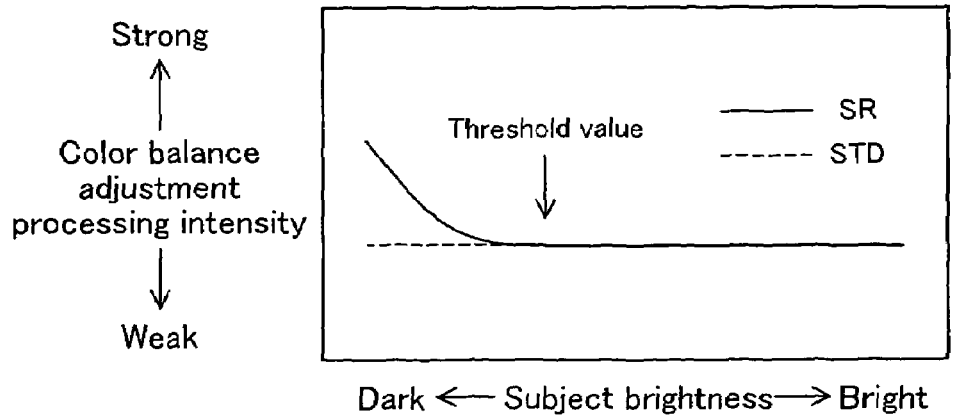
FIG. 16 illustrates another example of a relationship between subject brightness and color balance adjustment process intensity.

FIG. 16 illustrates another example of a relationship between subject brightness and color balance adjustment process intensity. Graph SR, which is used for color balance adjustment processing with reference to subject brightness, is constituted such that, over the range in which the subject brightness value is below a predetermined threshold value, color balance adjustment processing intensity is greater when the subject brightness value is smaller. In image data created under natural light (daylight), the likelihood of high subject brightness is quite high. Conversely, in image data created under artificial light, the likelihood of low subject brightness is quite high. That is, smaller subject brightness values are associated with greater likelihood of being created under artificial light. Accordingly, by increasing color balance adjustment processing intensity in association with smaller subject brightness values over the range in which the subject brightness value is below a predetermined threshold value, it is possible to reduce color shift resulting from light source spectral distribution, for individual sets of image data.

Color balance adjustment processing intensity need not vary continuously depending on subject brightness value, but could instead vary in stepwise fashion among a number of levels. By so doing, adjustment of color balance adjustment processing intensity may be simplified.

A point shared in common by both graph SR in FIG. 15(a) and graph SR in FIG. 16 is that "intensity of color balance adjustment processing is adjusted so as to be higher at lower levels of brightness." That is, "intensity of color balance adjustment processing is adjusted so as to be higher at lower levels of brightness" is defined herein to include both "adjustment such that intensity when brightness level is below a predetermined threshold value is greater than intensity when brightness is above the predetermined threshold value," and "adjustment such that as brightness level declines, intensity increases in monotonous fashion." Here, "adjustment such that as brightness level declines, intensity increases in monotonous fashion" means that "intensity does not decrease with a decrease in brightness."

Such "adjustment such that intensity of color balance adjustment processing is greater when the level of brightness is lower" is preferably carried out over the low brightness level range. When a shot is taken using a light source that tends to produce appreciable color shift, subject brightness tends to be low. In other words, it may be the that where brightness level is low, the likelihood of appreciable color shift is high. Thus, by performing "adjustment such that intensity of color balance adjustment processing is greater when the level of brightness is lower" over the range of low subject brightness, it becomes possible to minimize color shift based on the type of light source, without significantly altering the distinctive bright coloring and hues of the subject. The range deemed to have low subject brightness could be a range of 3 or less expressed as subject brightness converted to APEX units, for example.

Figure 17A:
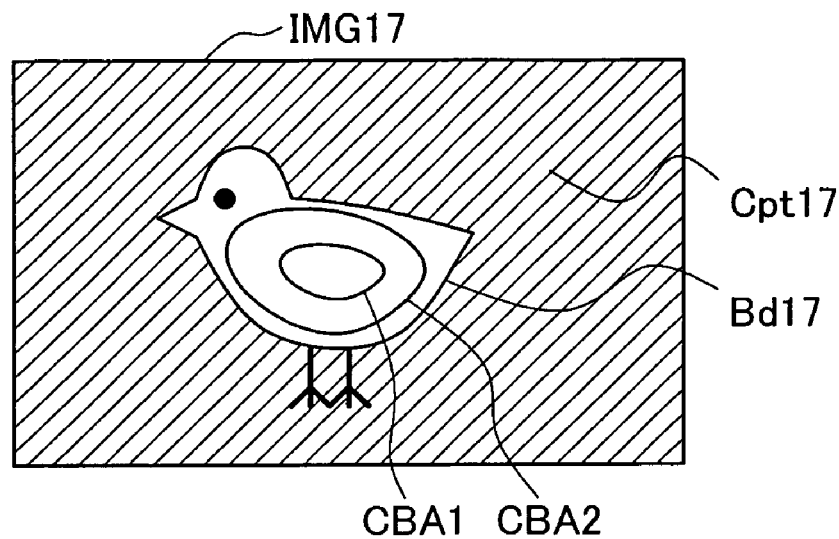
FIGS. 17(a) and 17(b) illustrate another example of a color balance adjustment process depending on subject brightness.

H2. Example 2 of a Color Balance Adjustment Process Depending on Subject Brightness FIG. 17 illustrates another example of a color balance adjustment process depending on subject brightness. Image IMG17 in FIG. 17(a) is the same as image IMG14 in FIG. 14(a). Within image IMG17, areas CBA1 and CBA2 are selected for use in calculating color shift. Area CBA2 is used in calculating color shift for use in color balance adjustment processing at higher intensity than the color balance adjustment processing based on area CBA1.

Figure 17B:
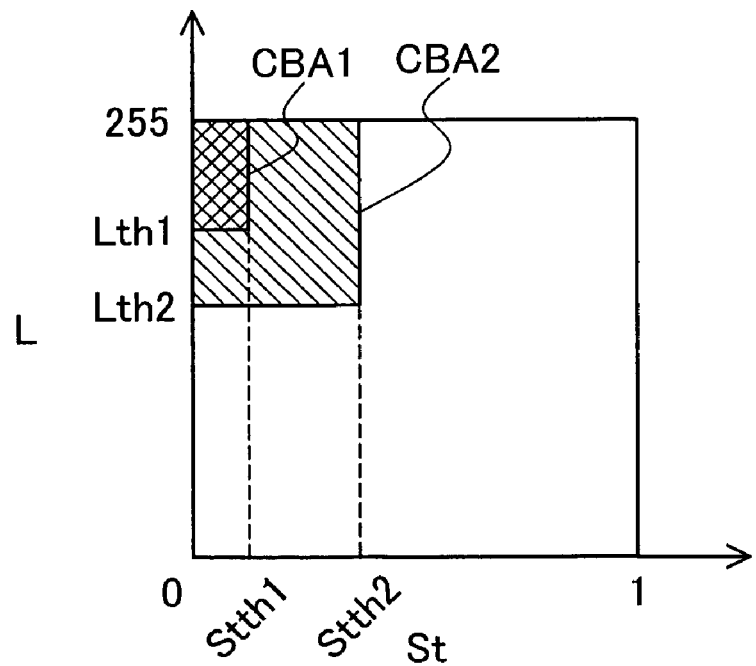

FIG. 17(b) is an illustration of conditions for selecting areas CBA1 and CBA2 for use in calculating color shift. The horizontal axis gives saturation St, and the vertical axis gives brightness L. Area CBA1 is composed of pixels having brightness L above a first brightness threshold value Lth1, and saturation St below a first saturation threshold value Stth1. Area CBA2 is composed of pixels having brightness L above a second brightness threshold value Lth2 smaller than first brightness threshold value Lth1, and saturation St below a second saturation threshold value Stth2 greater than first saturation threshold value Stth1. Thus, area CBA2 can contain pixels with higher saturation than area CBA1. As a result, in an image having shifted color balance, the extent of color shift calculated using area CBA2 will be greater than the extent of color shift calculated using area CBA1, and the processing level of color balance adjustment processing will be higher. That is, by adjusting brightness threshold value and saturation threshold value so as to expand the condition range for selecting the color shift calculation area, it is possible to perform more intense color balance adjustment processing. Thus, brightness threshold value and saturation threshold value can be process parameters that indicate the range of the substantially achromatic area, and can be process parameters that affect the result of the process for determining the magnitude of color shift by analysis of image data. It may also be thought that in this example, adjustment of color balance adjustment processing intensity is carried out by adjusting the magnitude of color shift calculated from a given image.

As the color balance adjustment processing intensity in the examples of color balance adjustment process depending on subject brightness shown in FIGS. 15 and 16, it is possible to employ the magnitude of condition range for selecting the color shift calculation area mentioned above. For example, there could be employed an arrangement whereby, if the subject brightness value is greater than the predetermined threshold value in the example depicted by graph SR shown in FIG. 15(a), area CBA1 in FIG. 17 is used as the area for calculating color shift, and if the subject brightness value is equal to or less than the predetermined threshold value, area CBA2 is used. By so doing, color shift based on type of light source many be reduced further. Threshold values for brightness and saturation, for selecting area CBA1 and area CBA2 may be arrived at on the basis of sensory evaluation of image output results. Where a number of intensity levels are possible depending on subject brightness value, as in the example given by graph SR in FIG. 16, threshold values for brightness and saturation are established such that the condition range for selecting color shift calculation area expands when intensity is greater. By so doing, color shift based on type of light source may be reduced for individual sets of image data. Adjustment of condition range may also be accomplished by setting either the brightness threshold value or saturation threshold value to a constant value, and adjusting the other. In any event, the arrangement is such that condition range expands at higher intensity. An arrangement whereby the condition range of the area for calculating color shift, and the ratio of the aforementioned magnitude of color shift to the magnitude of color balance adjustment processing level are both adjusted is also possible.

I. Other Examples of Automatic Picture Quality Adjustment Process

I1. Example 2 of Automatic Picture Quality Adjustment Process

Figure 18:
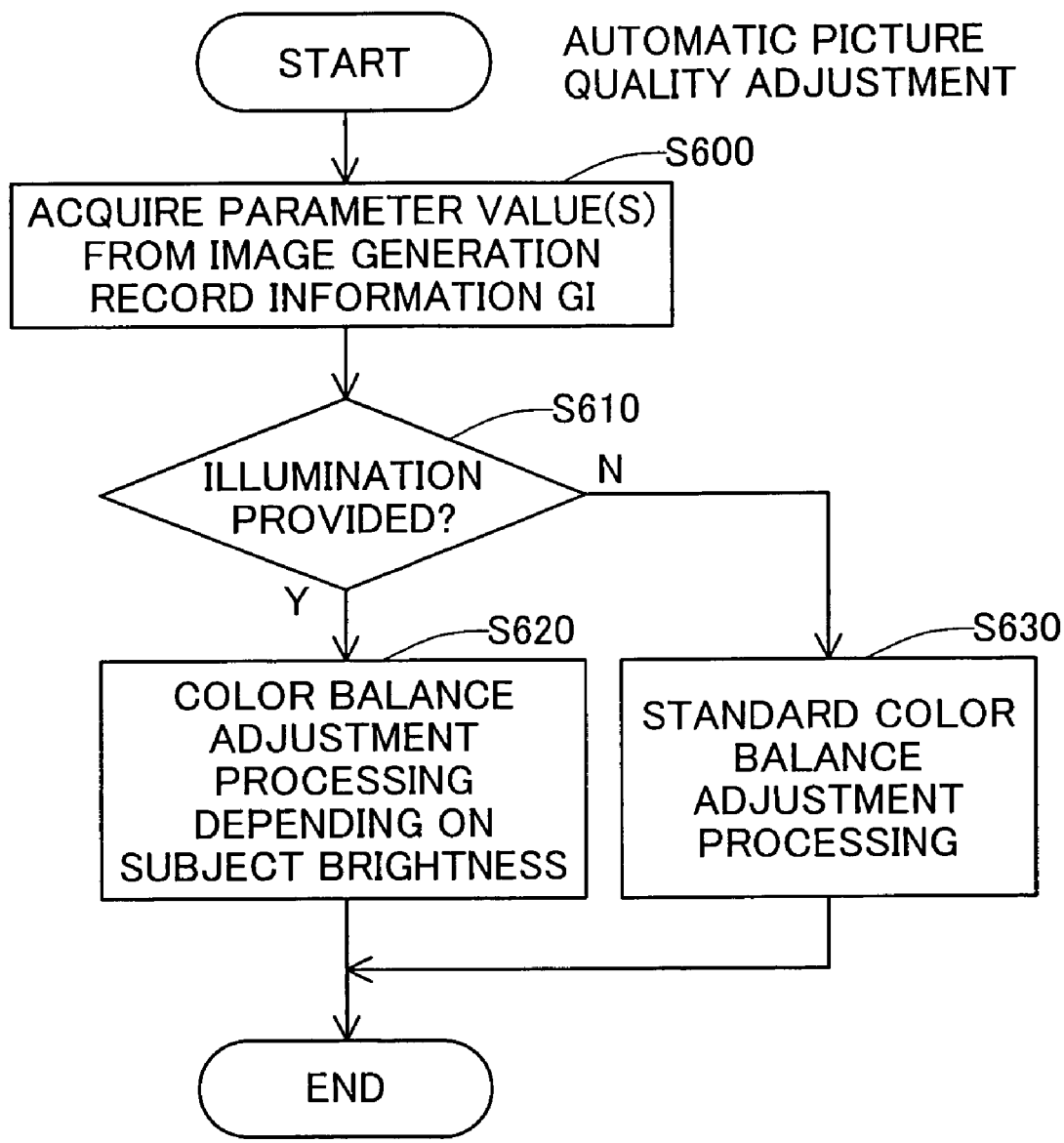
FIG. 18 is a flowchart showing a processing routine for an automatic picture quality adjustment process.

FIG. 18 is a flowchart showing a processing routine for an automatic picture quality adjustment process in another embodiment. A difference from the example depicted in FIG. 11 is that the system switches the type of color balance adjustment processing, on the basis of a determination as to whether illumination has been provided by a supplemental light source at the time image data was generated. In this example, the parameter value of flash information (FIG. 5), obtained by analyzing image generation record information GI, is used to determine whether illumination was provided by a supplemental light source. In the event that the operation result in the flash information indicates that the flash was fired, CPU 31 (FIG. 7) determines that illumination was provided. In the event that, as described previously, a reflected light sensing mechanism is present but sensed reflected light is absent, the determination is made that there has been no illumination. In the case of a "no flash" setting as well, it is determined that there has been no illumination.

In the event of a determination that no illumination has been provided by a supplemental light source (Step S610: Y), as in the example depicted in FIG. 11, CPU 31 executes color balance adjustment processing of different intensity depending on subject brightness (Step S620), and concludes the automatic picture quality adjustment process.

In the event of a determination that illumination has been provided by a supplemental light source (Step S610:No), standard color balance adjustment processing (i.e., that does not increase in intensity even when subject brightness is below a predetermined threshold value) is carried out (Step S630). Supplemental light sources such as a flash have spectral distributions similar to natural light (daylight). Thus, illumination with light from a supplemental light source can reduce color shift resulting from the spectral distribution of a light source. Accordingly, by employing standard color balance adjustment processing—which does not increase in intensity even when subject brightness is below a predetermined threshold value—in cases where illumination has been provided by light from a supplemental light source, it is possible to avoid any significant alteration of the distinctive bright coloring and hues of the subject.

I2. Example 3 of Automatic Picture Quality Adjustment Process

Figure 19:
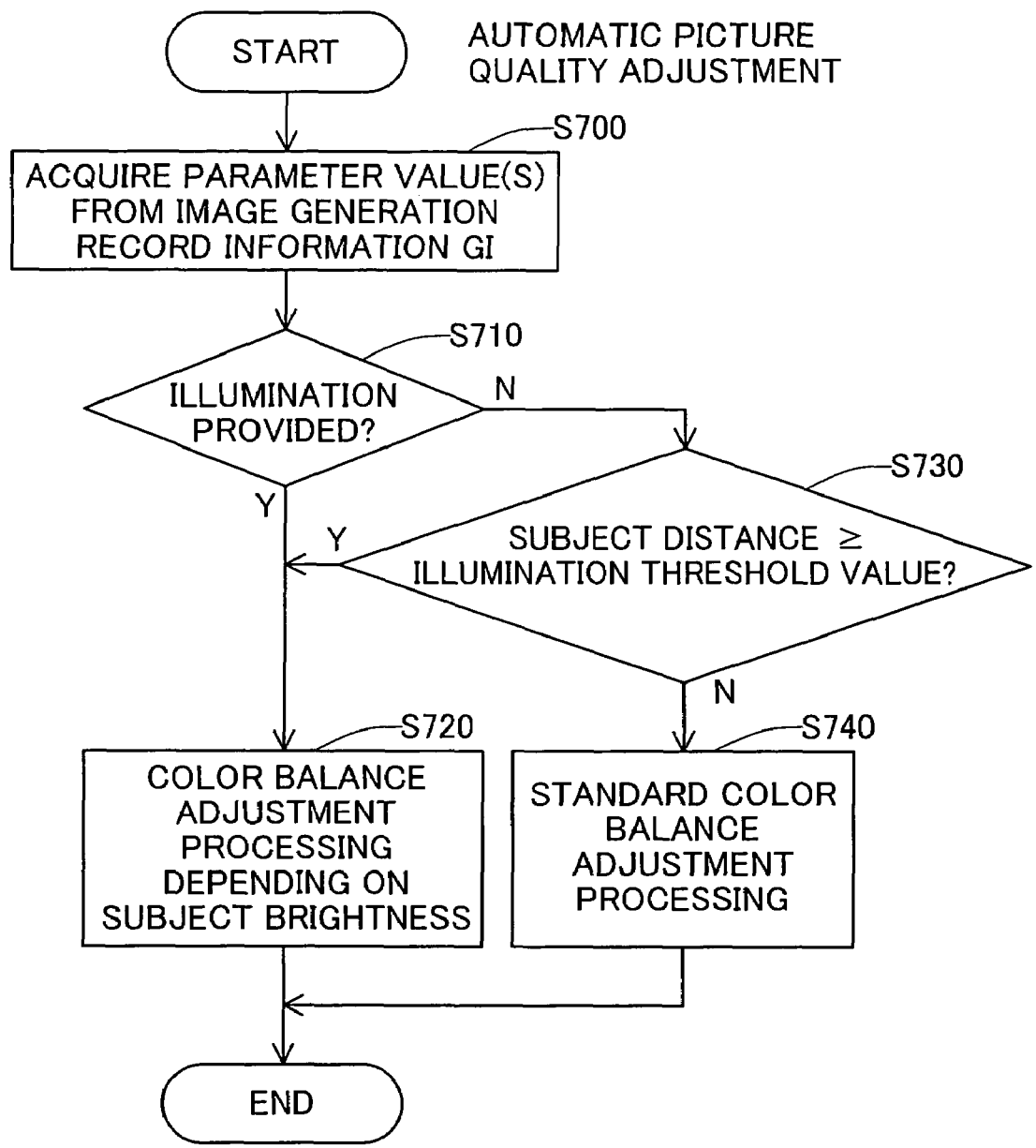
FIG. 19 is a flowchart showing a processing routine for an automatic picture quality adjustment process.

FIG. 19 is a flowchart showing a processing routine for an automatic picture quality adjustment process in another embodiment. A difference from the example depicted in FIG. 18 is that there is an additional determination as to whether subject distance exceeds an illumination threshold value (Step S730). In this example, the parameter value of subject distance information (FIG. 5) acquired from the image generation record information is used as the distance between the subject and image generating device. In the event that subject distance exceeds a predetermined illumination threshold value (Step S730:Y), color balance adjustment processing is executed on the basis of subject brightness (Step S720). The greater the subject distance, i.e., the distance from the image generating device to the subject, the smaller is the quantity of light reaching the subject from a supplemental light source. Thus, where subject distance is large (far), illumination with light from the supplemental light source is inadequately effective in reducing color shift due to the spectral distribution of a light source. Thus, where subject distance exceeds the illumination threshold value, by making a determination that no illumination has been provided by the supplemental light source, and executing color balance adjustment processing on the basis of subject brightness, it is possible to minimize color skew in an image having an appreciable extent of color shift due to light from a supplemental light source not reaching the subject. The illumination threshold value may be selected on the basis of sensory evaluation of image output results. For example, a value of 2 meters would be acceptable.

In the event that subject distance is smaller than the predetermined illumination threshold value (Step S730:No), standard color balance adjustment processing (i.e., that does not increase in intensity even when subject brightness is below a predetermined threshold value) is carried out (Step S740). It is thereby possible to avoid any significant alteration of the distinctive bright coloring and hues of the subject.

The illumination threshold value represents a standard value for determining the quantity of light reaching a subject. Thus, an illumination threshold value may be determined more appropriately by adjustment on the basis of other parameters that can change the quantity of light reaching a subject. For example, the illumination threshold may be designed to increase with an increase in flash intensity, included in the image generation record information GI. By so doing, determination of the size of subject distance can be made appropriately on the basis of flash intensity, that is, the quantity of light falling on a subject from a supplemental light source.

I3. Example 4 of Automatic Picture Quality Adjustment Process

Figure 20:
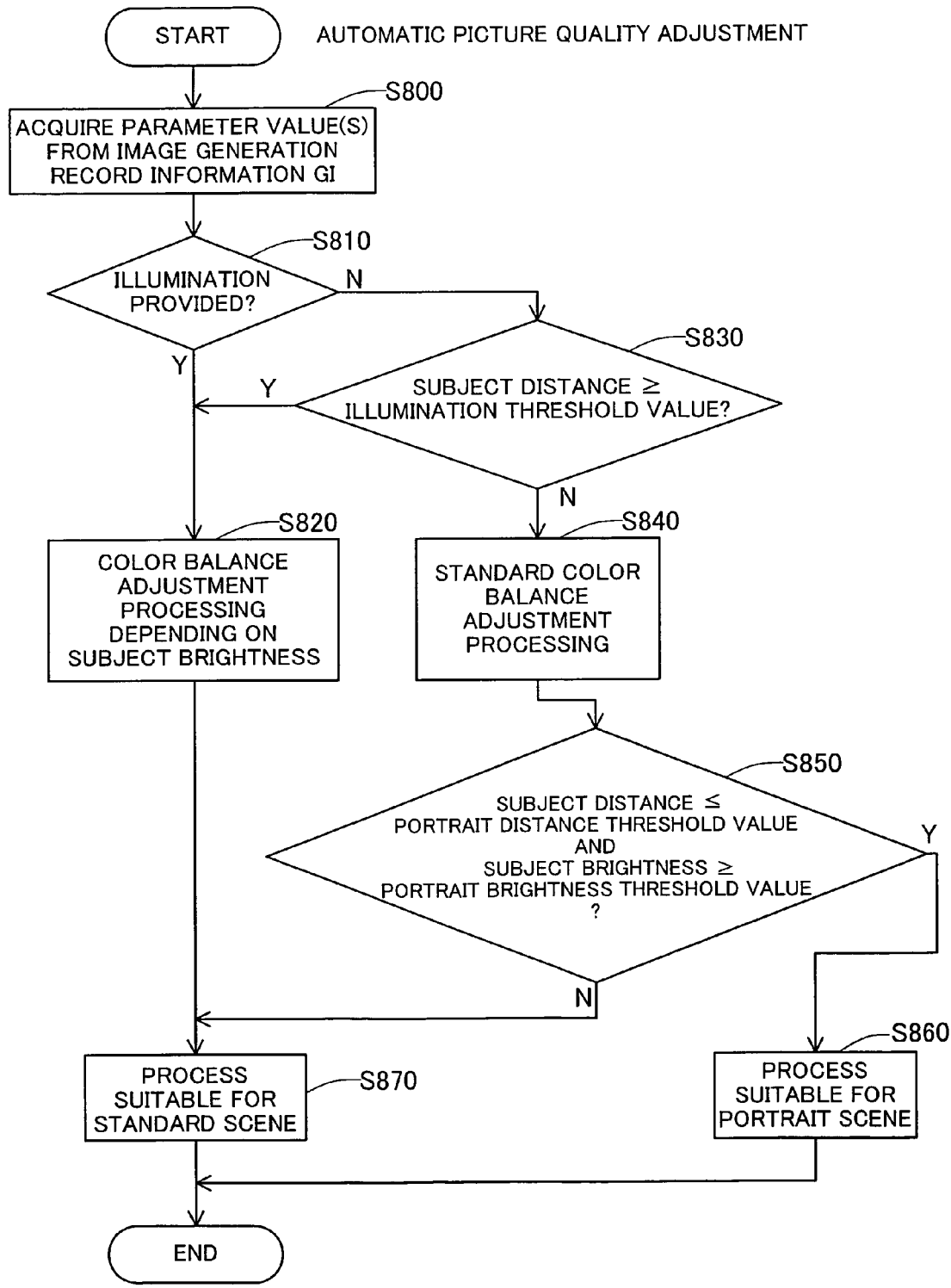
FIG. 20 is a flowchart showing a processing routine for an automatic picture quality adjustment process.

FIG. 20 is a flowchart showing a processing routine for an automatic picture quality adjustment process in another embodiment. A difference from the example depicted in FIG. 19 is that a determination is made as to whether the image is a portrait, and if it is portrait image, performing a picture quality adjustment process adapted specifically to portrait images. In this example, in the event that illumination is provided by light from a supplemental light source (Step S810:No, Step S830:No), the subject distance does not exceed a predetermined portrait distance threshold value, and the subject brightness value is above a portrait brightness threshold value (Step S850:Yes), the determination is made that the image is a portrait. As subject distance, the subject distance information parameter value (FIG. 5) from the image generation record information GI may be used, and as subject brightness value the subject brightness value information parameter value (FIG. 5) from the image generation record information GI may be used.

When photographing a human subject under a bright clear sky, it is common to reduce subject distance (move closer) so that the human subject appears larger, and to use flash or other supplemental light source to avoid shadows on the face. Thus, where illumination has been provided by a supplemental light source, and where additionally the subject distance is below a threshold value for human subject distance and subject brightness is above a threshold value for human subject brightness, it may be determined that the image is a portrait. The human subject distance threshold value and human subject brightness threshold value may be selected on the basis of sensory evaluation of image output results. For example, a value of 2 meters for the human subject distance threshold value, and a value of 6 (APEX units) for the human subject brightness threshold value would be acceptable.

If it is determined that an image is a portrait (Step S850:Yes), processing suitable for a portrait scene (described later) is executed (Step S860), and automatic picture quality adjustment processing is concluded.

On the other hand, if a portrait image determination is not made (Step S810:Yes, or S830:Yes, or S850:No), processing suitable for a standard scene (described later) is executed (Step S860), and automatic picture quality adjustment processing is concluded.

In this example, processing suitable for each type of scene is executed in the manner shown in FIG. 21. For example, where it has been determined that an image is a portrait, contrast is set to a fairly soft level, brightness to a fairly high level, saturation to a fairly low level, and sharpness to a fairly weak level. Since skin color has been selected as a memory color, skin color correction is performed using pre-stored skin color data. Noise processing is off. By performing picture quality adjustment in this manner, the image is given a soft atmosphere, and the skin color of the human subject adjusted to appropriate skin color. However, picture quality adjustment need not conform to the settings indicated in FIG. 21; other settings may be used.

In this embodiment, the brightness level of a subject can be used in this way to select automatically a shooting scene for an individual set of image data, and to perform appropriate picture quality processing thereon. A resultant advantage is that the user does not need to perform a complex manual procedure during shooting or printing.

J. Arrangement of Image Output System Employing Image Data Processing Device

Figure 22:
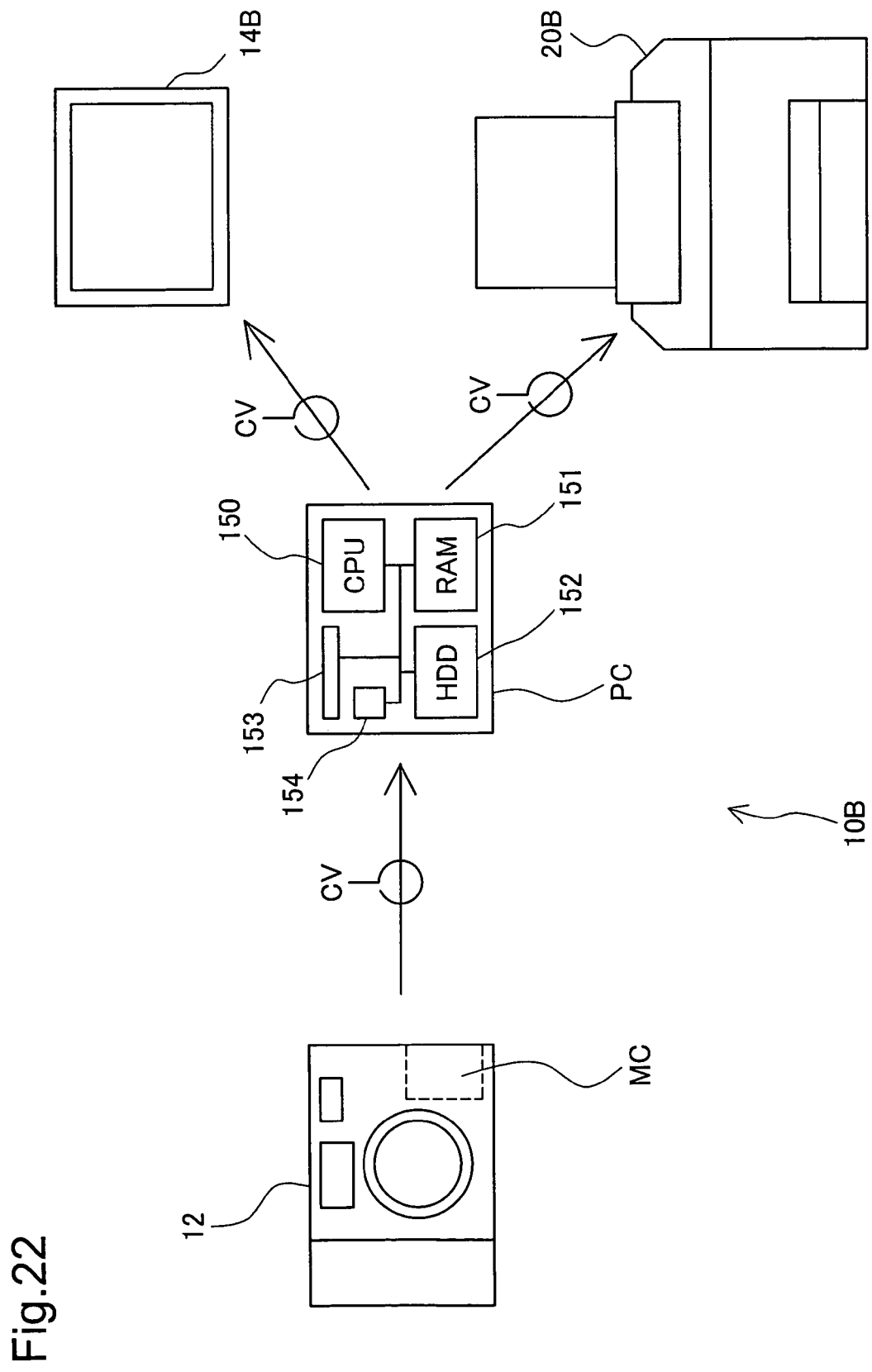
FIG. 22 illustrates an example of an image output system in which an image data processing device may be implemented.

FIG. 22 is an explanatory diagram showing an example of an image output system in which an image data processing device may be implemented, by way of an embodiment of the present invention. Image output system 10B comprises a digital still camera 12 as an image generating device for generating image files; a computer PC for executing picture quality adjustment processing based on an image file; and a printer 20B as an image output device for outputting images. Computer PC is computer of commonly used type, and functions as an image data processing device. As the image output device, monitor 14B such as a CRT display and LCD display, or a projector could be used instead of printer 20B. In the following description, it is assumed that printer 20B is used as the image output device. This example differs from the image output system example described previously (FIG. 1) in that the image data processing device having an picture quality adjuster, and the image output device equipped having an image output unit, are constituted independently. The computer PC serving as the image data processing device and the printer having an image output unit can be termed an "output device" in the broad sense.

An image file created in digital still camera 12 is transferred to computer PC via a cable CV, or by directly inserting into computer PC a memory card MC having the image file stored thereon. Computer PC executes picture quality adjustment processing of the image data based on the read out image file. The image data produced by picture quality adjustment processing is transferred to printer 20B via cable CV, and output by printer 20B.

Computer PC comprises a CPU 150 for executing a program that realizes the aforementioned picture quality adjustment processing; RAM 151 for temporarily storing results of operations by CPU 150, image data, and the like; and a hard disk drive (HDD) 152 for storing data needed for picture quality adjustment processing, such as a picture quality adjustment processing program, lookup table, aperture value table, and the like. CPU 150, RAM 151, and HDD 152 function as an picture quality adjuster. Computer PC further comprises a memory card slot 153 for installing a memory card MC; and an input/output terminal 154 for connecting a connector cable from digital still camera 12 or the like.

An image file GF generated by a digital still camera 12 is supplied to computer PC via a cable, or via a memory card MC. When an image data processing application program, either an image retouching application or a printer driver, is run under user control, CPU 150 executes an image processing routine (FIG. 9) to process the read in image file GF. Alternatively, the image data processing application program may be set to start up automatically when a memory card MC is inserted into memory card slot 153, or when connection of a digital still camera 12 to input/output terminal 154 via a cable is detected.

Image data processed by CPU 150, rather than being output in Step S250 of the image processing routine (FIG. 9), is instead transferred to an image output device, for example, printer 20B, whereupon the image output device receiving the image data executes image output.

In this example, since image processing is carried out by a picture quality adjuster in computer PC, it is possible to use an image output device that does not have an picture quality adjuster. Where the image output device is provided with an picture quality adjuster, image data could be output to the image output device without being subjected to image processing on computer PC, and image processing instead carried out by the picture quality adjuster of the image output device.

In the examples described hereinabove, using subject brightness or lightness, appropriate picture quality adjustment may be carried out automatically on portrait images or images color-shifted due to the type of light source.

The invention is not limited to the embodiments set forth hereinabove, and may be reduced to practice in various modes without departing from the scope and spirit thereof, the following variations are possible, for example.

K. Variant Examples

K1. Variant Example 1

In the embodiments hereinabove, it would be possible to use a combination of aperture value and shutter speed, or a combination of these two items of information plus the sensitivity of the optical circuit (ISO speed rate), in place of the subject brightness value as the subject brightness information relating to subject brightness. The two values L1 and L2 given in Equation 6 below are subject brightness level, calculated on the basis of these combinations of information.

$$A = 2 * \log_2(F \text{ number})$$ [Eq. 6]

$$Tv = -\log_2(ShutterSpeed(\sec))$$

$$Sv = \log_2\left(\frac{ISO \text{ speed rating}}{3.125}\right)$$

$$L1 = Av + Tv$$

$$L2 = Av + Tv - Sv$$

In Equation 6, Av is aperture value (F number) converted to APEX units, Tv is shutter speed converted to APEX units, and Sv is optical circuit sensitivity (ISO speed rate) converted to APEX units. These three values Av, Tv, Sv are adjusted according to subject brightness, so that the quantity of light received by the image generating device when generating image data is the proper value. Where a subject has a high level of brightness, adjustment is made to a larger aperture value (F number), i.e., larger Av. Shutter speed is adjusted to a smaller value, i.e. larger Tv, and ISO speed rate is adjusted to a smaller value, i.e. smaller Sv. L1 (=Av+Tv) indicates the quantity of light received by the image generating device, and Av and Tv are adjusted so that the magnitude of L1 is an appropriate value for the brightness level of the subject. L2 (=Av+Tv−Sv) indicates subject brightness. Where Sv (optical circuit sensitivity) is adjustable, Av, Tv and Sv are adjusted so that the magnitude of L2 is an appropriate value for the brightness level of the subject. Where a subject has a high brightness level, L1 or L2 is adjusted to a larger value, and where a subject has a low brightness level, L1 or L2 is adjusted to a smaller value. Accordingly, in the examples described above, L1 or L2, that is, "Av+Tv" or "Av+Tv−Sv", can be used as the level of brightness of the subject. In particular, where Av, Tv and Sv have been adjusted so that the quantity of light received by the image generating device is the proper value, L2 is a value equivalent to subject brightness level converted to APEX units, and thus can be used as-is instead of the subject brightness value mentioned earlier. Where image generation record information GI includes these values Av, Tv and Sv, the parameter values thereof can be used to calculate the brightness level of the subject.

K2. Variant Example 2

Figure 23:
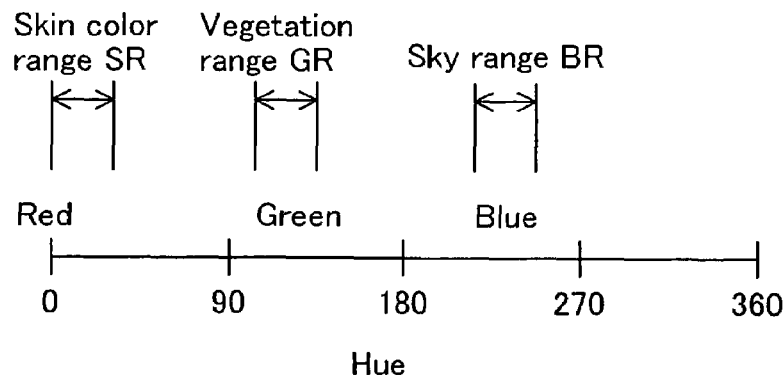
FIG. 23 is an illustration of color ranges characteristic of subjects.

In the preceding examples, an area having a predetermined hue characteristic of a subject may be excluded from the area used in calculating color shift. FIG. 23 is an illustration showing hue ranges characteristic of subjects. In this example, hue H assumes values in the range 0°-360°, with 0° representing red, 120° representing green, and 240° representing blue. In this example, a hue H range of 0° to 30° is designated as the skin tone range SR indicating the color of the human skin; a hue H range of 100° to 130° is designated as the vegetation range GR indicating the color of vegetation or green hills; and a hue H range of 230° to 260° is designated as the sky range BR indicating the color of blue sky. By excluding from the color shift calculation area an area in which hue H is within the skin range SR, it becomes possible to suppress significant change in the vividness and hue of the skin color characteristic of the subject in a portrait image. Similarly, by excluding the vegetation range GR, it becomes possible to suppress significant change in the vividness and hue of the green color characteristic of the subject in a plant image or landscape image such as mountains. By excluding the sky range BR, it becomes possible to suppress significant change in the vividness and hue of blue in a landscape image that includes the sky. Hue ranges need not necessarily be those described above; other different ranges could be established.

K3. Variant Example 3

In the preceding examples, it would be possible to employ an arrangement whereby pixels are culled at regular intervals, and only the remaining pixels are used to calculate color shift, rather than using all pixels within the color shift calculation area. By so doing, the color shift calculation process can be speeded up. Alternatively, the entire image area can be used as the color shift calculation area. By so doing, the color shift calculation process can be simplified.

K4. Variant Example 4

Where the color balance (white balance) of image data has been set by the user, it is preferable to perform either a process of "lowering the intensity of color balance adjustment processing" or "not performing color balance adjustment processing." By so doing, it becomes possible to suppress significant change in the color balance set by the user. The determination as to whether color balance (white balance) of image data has been set by the user may be made using the white balance information (FIG. 5) included in the image generation record information GI.

K5. Variant Example 5

In the preceding examples, when determining distance between a subject and the image generating device, it would be possible to use, besides subject distance information, other distance information that allows distance range to be set as a parameter value. For example, subject distance range information (FIG. 5) set by being selected from macro (0-1 m), near (1-3 m), and far (3 m-) could be used. In this case, a representative distance for each distance range could be established in advance, and this representative distance compared with a threshold value to determine magnitude. By way of representative distance, for a distance range having an established upper limit and lower limit of distance, the median value could be used; or for a distance range having only an upper limit or lower limit, the upper limit or lower limit could be used.

K6. Variant Example 6

Where generation of image data is performed with a supplemental light source while an image generating device is situated apart from the supplemental light source, it is preferable to make a determination as to the distance between the subject and the supplemental light source, rather than the distance between the subject and the image generating device, as in the preceding examples. By so doing, it is possible to target, for color balance adjustment processing depending on subject brightness, images in which the subject has not been adequately illuminated due to a long distance between a supplemental light source and the subject.

Figure 24:
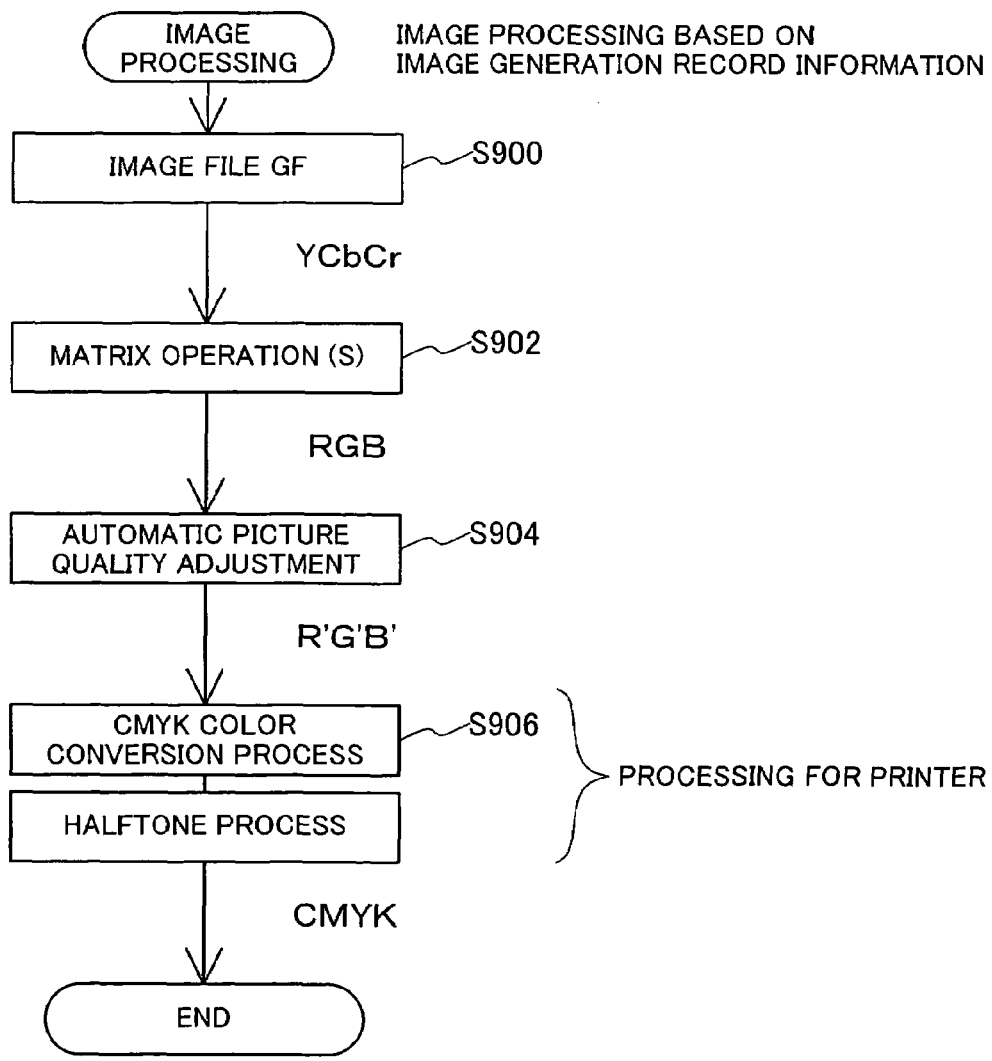
FIG. 24 is a flowchart showing an image processing routine omitting a color space conversion process.

K7. Variant Example 7

Where an image file GF does not include image data gamma value or color space information, the color space conversion process of the image processing routine shown in FIG. 10 (Step S320 and Step S330) can be omitted. FIG. 24 is a flow chart showing an image processing routine from which the color space conversion process has been omitted. In Step S902, image data acquired in Step S900 is converted from image data based on a YCbCr color space to data based on an RGB color space. Next, in Step S904, automatic picture quality adjustment processing is executed using the image data obtained in Step S902. Next, in Step S906, a CYMK conversion process and halftone process for printing are executed.

K8. Variant Example 8

Figure 25:
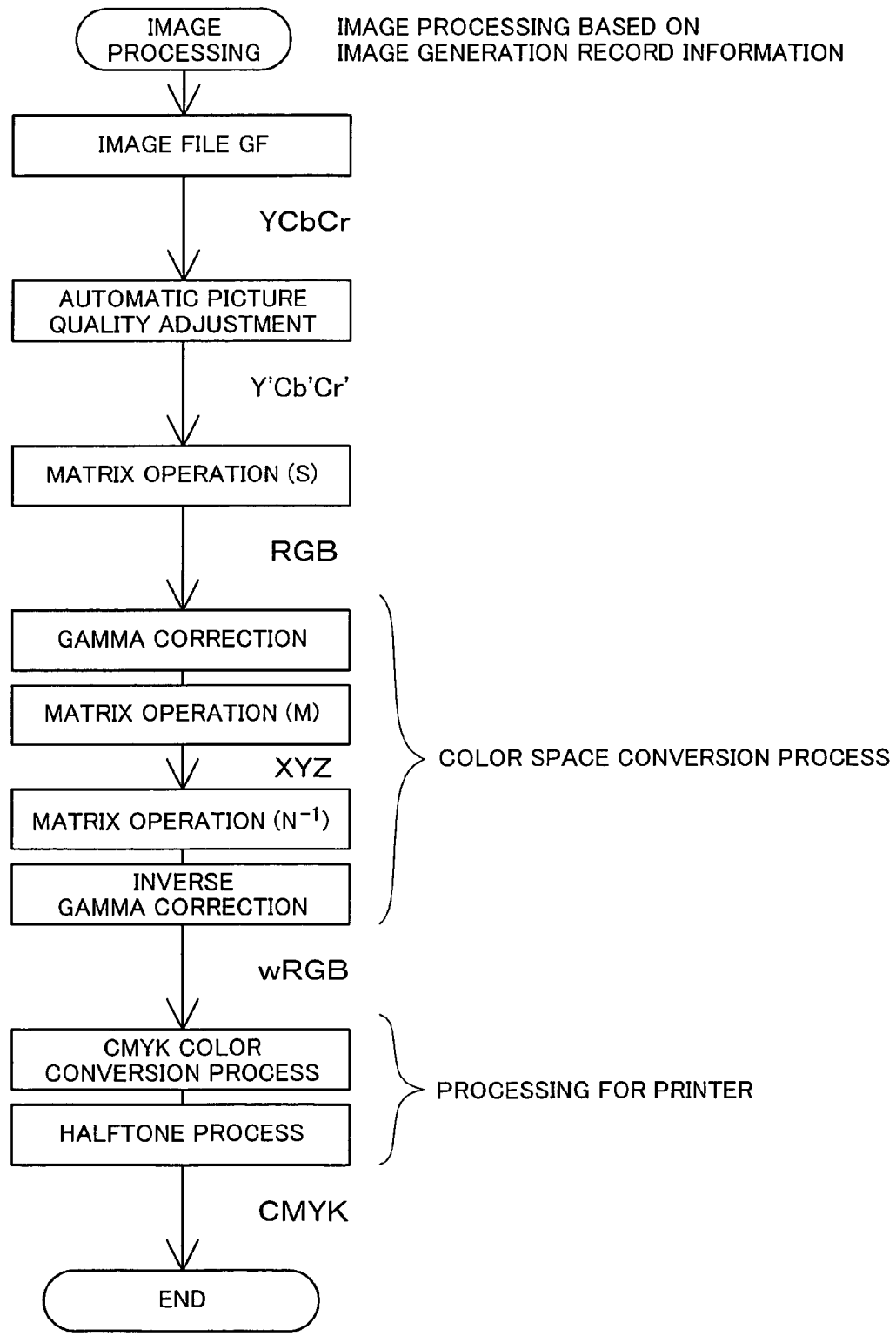
FIG. 25 is a flowchart showing another example of a processing routine for image processing based on image generation record information.

In the preceding examples, automatic picture quality adjustment processing is executed after executing color space conversion, but instead color space conversion could be executed after executing automatic picture quality adjustment processing. For example, image processing could be executed according to the flowchart shown in FIG. 25.

K9. Variant Example 9

Figure 26:
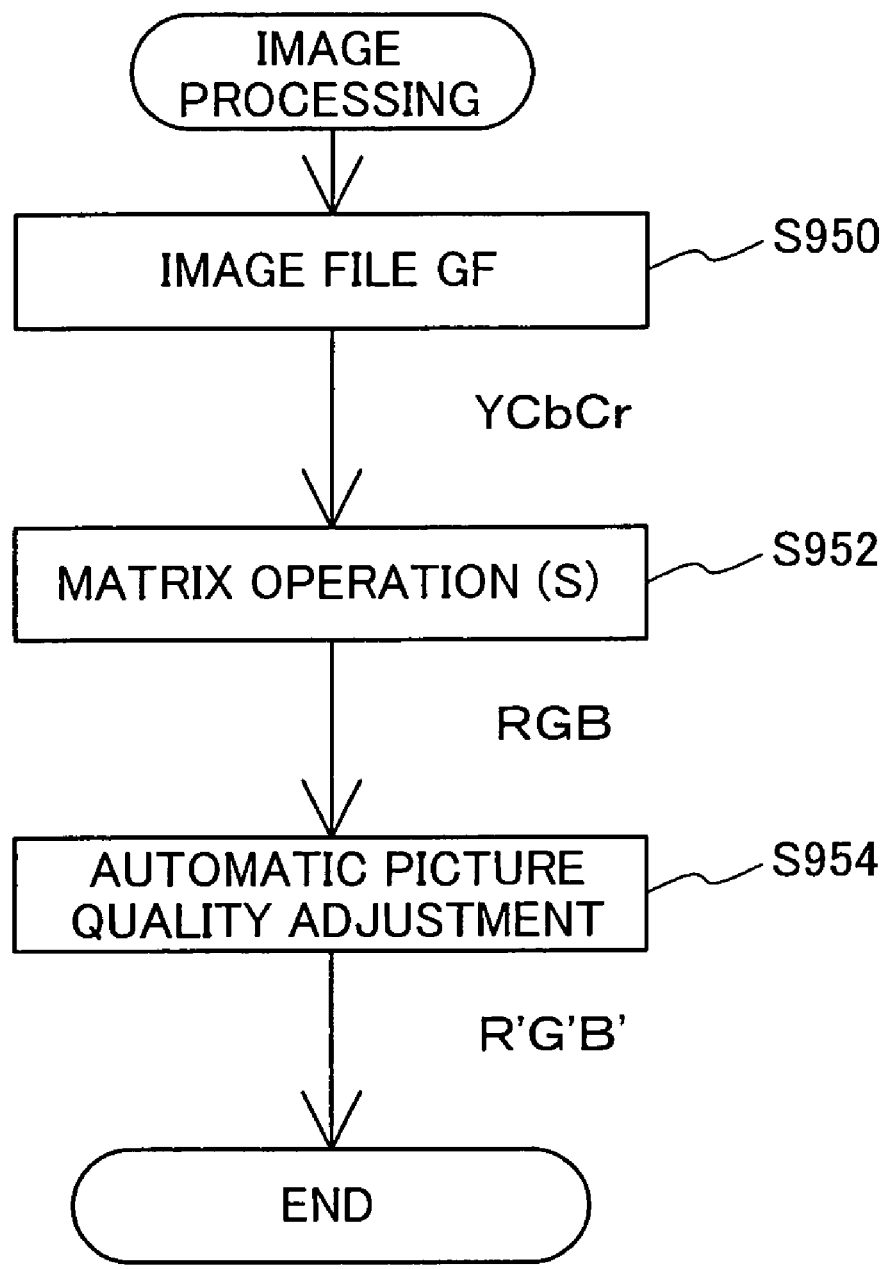
FIG. 26 is a flowchart showing another example of a processing routine for image processing based on image generation record information.

In the preceding examples, a printer is used as the image output unit, but an image output unit other than a printer could be used instead. FIG. 26 is a flowchart showing a processing routine for image processing based on image generation record information where a CRT is used as the image output unit. In contrast to the flowchart in FIG. 10 which uses a printer as the image output unit, the CYMK conversion process and halftone process for printing are omitted. Also, since a CRT can represent an RGB color space of image data obtained by executing a matrix operation (S), the color space conversion process is omitted as well. Where image data based on an RGB color space obtained in Step S952 includes data outside the defined gamut of the RGB color space, the out-of-defined-gamut data is clipped, and then step S954 is executed. Where the color space utilizable by an image output unit is different from an RGB color space, a color conversion process to a color space utilizable by the image output unit is executed in a manner analogous to executing a CMYK color conversion process where a printer is used, and the resultant image is output by the image output unit.

K10. Variant Example 10

The description in the preceding examples take an Exif format file as a specific example of the image file GF, but the format of the image file pertaining to the present invention is not limited to this. That is, any image file containing image data generated by an image generating device, and image generation record information GI describing conditions (information) at the time of generation of the image data is acceptable. With such a file, picture quality of image data generated by an image generating device can be appropriately adjusted automatically and output from an output device.

K11. Variant Example 11

Values of matrices S, $N^{-1}$, and M in the equations are merely exemplary, and can be modified appropriately depending on color space on which the image file is based, color space utilizable by an image output unit, or the like.

K12. Variant Example 12

The preceding examples was described using a digital still camera 12 as the image generating device, but image files could be generated using a different image generating device, such as a scanner, digital video camera, or the like.

K13. Variant Example 13

In the preceding examples, the description takes the example of a case where image data GD and image generation record information GI are contained in the same image file GF, but image data GD and image generation record information GI need not necessarily be stored within the same file. That is, it is sufficient for image data GD and image generation record information GI to be associated with each other; for example, it would be acceptable to generate associating data that associates image data GD with image generation record information GI; store one or several sets of image data and image generation record information GI in independent files; and refer to the associated image generation record information GI when processing the image data GD. This is because, in this case, although the image data GD and image generation record information GI are stored in separate files, at the point in time of image processing which utilizes the image generation record information GI, the image data GD and image generation record information GI are in inseparably linked, and thus function substantially the same as if they were stored in the same file. That is, the term image file GF in the embodiments includes files of a form wherein image data GD and image generation record information GI are associated, at least at the point in time that image processing takes place. Also included are motion video files stored on optical disk media such as CD-ROM, CD-R, DVD-ROM, and DVD-RAM.

While the present invention has been described in detail and shown hereinabove, these are given by way of example, and is not limited to these, the spirit and scope of the invention being limited only by the appended claims.

What is claimed is:

1. An image processing method, comprising the steps of:
providing image data generated by an image generating device, and image generation record information associated with the image data, the image generation record information including at least operating information about the image generating device at the time of generation of the image data; and
when the image generation record information includes subject brightness information relating to brightness of a subject at the time of generation of the image data, adjusting picture quality of the image data using a subject brightness level derived from the subject brightness information,
wherein the image generation record information further includes supplemental light source firing information at the time of generation of the image data, and information relating to a distance between the subject of the image data and the image generating device at the time of generation of the image data,
and wherein the picture quality adjustment step includes a step of performing the picture quality adjustment processing suitable for a portrait image when it is determined that the supplemental light source provided illumination based on the firing information, and that the distance from the subject is shorter than a predetermined distance threshold value, and that the subject brightness level is above a predetermined brightness threshold value.

2. An image processing device for performing image processing using image data generated by an image generating device, and image generation record information associated with the image data, the image generation record information including at least operating information about the image generating device at the time of generation of the image data, the image processing device comprising:
a picture quality adjuster that, when the image generation record information includes subject brightness information relating to brightness of a subject at the time of generation of the image data, adjusts picture quality of the image data using a subject brightness level derived from the subject brightness information,
wherein the image generation record information further includes supplemental light source firing information at the time of generation of the image data, and information relating to a distance between the subject of the image data and the image generating device at the time of generation of the image data, and
wherein the picture quality adjuster performs picture quality adjustment processing suitable for a portrait image when it is determined that the supplemental light source provided illumination based on the firing information, and that the distance from the subject is shorter than a predetermined distance threshold value, and that the subject brightness level is above a predetermined brightness threshold value.

3. An output device for outputting an image using image data generated by an image generating device, and image generation record information associated with the image data, the image generation record information including at least operating information about the image generating device at the time of generation of the image data, the output device comprising:
a picture quality adjuster that, when the image generation record information includes subject brightness information relating to brightness of a subject at the time of generation of the image data, adjusts picture quality of the image data using a subject brightness level derived from the subject brightness information, and
an image output unit for outputting an image according to the image data after the picture quality adjustment,
wherein the image generation record information further includes supplemental light source firing information at the time of generation of the image data, and information relating to a distance between the subject of the image data and the image generating device at the time of generation of the image data,
and wherein the picture quality adjuster performs picture quality adjustment processing suitable for a portrait image when it is determined that the supplemental light source provided illumination based on the firing information, and that the distance from the subject is shorter than a predetermined distance threshold value, and that the subject brightness level is above a predetermined brightness threshold value.

4. A computer program product for causing a computer to execute image processing using image data generated by an image generating device, and image generation record information associated with the image data, the image generation record information including at least operating information about the image generating device at the time of generation of the image data, the computer program product comprising:
a computer-readable medium; and
a computer program stored on the computer-readable medium, the computer program includes a program for causing a computer to execute a function of, when the image generation record information includes subject brightness information relating to brightness of a subject at the time of generation of the image data, adjusting picture quality of the image data using a subject brightness level derived from the subject brightness information,
wherein the image generation record information further includes supplemental light source firing information at the time of generation of the image data, and information relating to a distance between the subject of the image data and the image generating device at the time of generation of the image data,
and wherein the function of adjusting picture quality includes performing picture quality adjustment processing suitable for a portrait image when it is determined that the supplemental light source provided illumination based on the firing information, and that the distance from the subject is shorter than a predetermined distance threshold value, and that the subject brightness level is above a predetermined brightness threshold value.

* * * * *